United States Patent
Jin et al.

(10) Patent No.: US 11,859,686 B2
(45) Date of Patent: Jan. 2, 2024

(54) ELECTROMAGNETIC FORCE CONTROL METHOD OF MAGNETIC DISK TYPE NEGATIVE STIFFNESS ELECTROMAGNETIC ACTUATOR

(71) Applicant: Harbin Engineering University, Harbin (CN)

(72) Inventors: Guoyong Jin, Harbin (CN); Junjie Yuan, Harbin (CN); Tiangui Ye, Harbin (CN); Zhigang Liu, Harbin (CN)

(73) Assignee: HARBIN ENGINEERING UNIVERSITY, Harbin (CN)

( * ) Notice: Subject to any disclaimer, the term of this patent is extended or adjusted under 35 U.S.C. 154(b) by 408 days.

(21) Appl. No.: 17/236,297

(22) Filed: Apr. 21, 2021

(65) Prior Publication Data
US 2021/0310537 A1 Oct. 7, 2021

(30) Foreign Application Priority Data
Dec. 28, 2020 (CN) .......................... 202011589270.2

(51) Int. Cl.
*F16F 15/00* (2006.01)
*F16F 15/03* (2006.01)

(52) U.S. Cl.
CPC ............ *F16F 15/002* (2013.01); *F16F 15/03* (2013.01); *F16F 2222/06* (2013.01); *F16F 2228/001* (2013.01); *F16F 2228/063* (2013.01); *F16F 2230/18* (2013.01)

(58) Field of Classification Search
CPC ...... F16F 15/002; F16F 15/03; F16F 2222/06; F16F 2228/001; F16F 2228/063; F16F 2230/18
See application file for complete search history.

(56) References Cited

U.S. PATENT DOCUMENTS 11,473,647 B1 * 10/2022 Shahan ................ F16F 15/085
2018/0328434 A1 * 11/2018 Van Lankvelt ..... G03F 7/70716

* cited by examiner

*Primary Examiner* — Zoheb S Imtiaz
(74) *Attorney, Agent, or Firm* — IPRO, PLLC; Na Xu

(57) ABSTRACT

The present disclosure is an electromagnetic force control method of a magnetic disk type negative stiffness electromagnetic actuator. The present disclosure relates to the technical field of vibration control. According to the actually required static bearing capacity, the present disclosure determines the positive stiffness k of a mechanical spring required for a magnetic disk type quasi-zero stiffness vibration isolator; and establishes an electromagnetic force mathematical model of a single electromagnet under a condition of magnetic unsaturation. The present disclosure aims at the magnetic disk type quasi-zero stiffness vibration isolator and takes the coil current as an input control variable, so that the electromagnetic force and displacement of the negative stiffness electromagnetic actuator have a linear relationship, thereby changing the non-linear nature of a vibration isolation system, avoiding the multi-stable phenomenon caused by the non-linear electromagnetic force during working, and eliminating complex dynamic behaviors such as jumping when the whole vibration isolator works. Complex sensors and control systems are not needed, and implementation manners are simple and convenient.

6 Claims, 4 Drawing Sheets

ELECTROMAGNETIC FORCE CONTROL METHOD OF MAGNETIC DISK TYPE NEGATIVE STIFFNESS ELECTROMAGNETIC ACTUATOR

TECHNICAL FIELD

The present disclosure relates to the technical field of vibration control, and is an electromagnetic force control method of a magnetic disk type negative stiffness electromagnetic actuator.

BACKGROUND

As an important technical means to attenuate vibration and reduce noise, the vibration isolation technology aims to take certain measures between a vibration source and a system, and install appropriate vibration control or vibration isolation apparatuses to isolate the direct transmission of vibration. In theory, traditional passive vibration isolators can only attenuate the vibration of which the excitation frequency is greater than times the $\sqrt{2}$ inherent frequency of the system. Therefore, in the field of low-frequency vibration isolation, the quasi-zero stiffness vibration isolation technology has received more and more attention in recent years.

The quasi-zero stiffness vibration isolator is mostly formed by combination of positive and negative stiffness structures in parallel, which can reduce the overall stiffness of the system to be close to or equal to zero, realize low dynamic stiffness while ensuring a high static support capacity, reduce the inherent frequency of the system, broaden the vibration isolation frequency band of the system, and can be well used to solve the problem of low-frequency vibration isolation.

As the key point of the quasi-zero stiffness technology, the implementation manner of the negative stiffness directly determines the overall performance of the vibration isolation system. At present, the structure for realizing the negative stiffness is mainly divided into: a mechanical spring type, a magnet type, a rubber type and an electromagnet type. The acting force of the negative stiffness actuator exhibits significant non-linear characteristics with the displacement in the vicinity of a working point. Due to the nature of a non-linear system, a quasi-zero stiffness system may have multiple attractors, which causes a multi-stable phenomenon, resulting in complex dynamic behaviors such as jumping when the whole vibration isolator works. If large-amplitude attractors are to be migrated to small-amplitude attractors to attenuate vibration and reduce noise, control systems and strategies will be quite complex.

In view of the above problems, considering that in many implementation manners of a negative stiffness actuator, since the control manner of the electromagnetic mechanism is relatively flexible, the vibration isolation performance of the mechanism can be further improved by designing related controllers and formulating control strategies, and the electromagnetic mechanism has good accuracy and rapidity, the electromagnet type negative stiffness actuator has gradually become the key point of research. The magnetic disk type electromagnet mechanism has the characteristics of large electromagnetic force, high suction speed and little magnetic leakage, and the magnetic disk type electromagnet mechanism can be symmetrically arranged in a longitudinal direction in structure so as to be designed into a negative stiffness electromagnetic actuator.

SUMMARY

Aiming at a negative stiffness electromagnetic actuator of a magnetic disk type quasi-zero stiffness vibration isolator, the present disclosure proposes a linear control method of "electromagnetic force-displacement". The present disclosure provides the following technical solution:

an electromagnetic force control method of a magnetic disk type negative stiffness electromagnetic actuator includes the following steps:

step 1: according to the static bearing capacity, selecting a mechanical spring for providing positive stiffness of a vibration isolation system, and determining the positive stiffness of the spring;

step 2: establishing an electromagnetic force expression under magnetic unsaturation, and determining an electromagnetic attraction force of an electromagnet;

step 3: enabling a negative stiffness electromagnetic actuator to be symmetrical up and down, and establishing an electromagnetic force-displacement expression according to the negative stiffness electromagnetic actuator under a condition of magnetic unsaturation;

step 4: analyzing the electromagnetic force-displacement expression, and determining an expression about a current passing into upper and lower coils, a structural parameter and a displacement, a magnitude of ideal constant value negative stiffness when the negative stiffness electromagnetic actuator takes the current as an input control variable of a system;

step 5: establishing a vibration isolation system dynamic formula, and determining a vibration response according to the electromagnetic force-displacement expression of the negative stiffness electromagnetic actuator under ideal conditions;

step 6: according to the vibration response and based on the expression about the current, the structural parameter and the displacement, the magnitude of the ideal constant value negative stiffness, determining a control current required for meeting a linear electromagnetic force-displacement relationship of a negative stiffness electromagnetic actuator.

Preferably, the step 2 is specifically as follows:

establishing an electromagnetic force expression under magnetic unsaturation, determining an electromagnetic attraction force of an electromagnet, and representing the electromagnetic attraction force of the electromagnet by the following formulas:

$$F_{mag1} = \frac{1}{2}\frac{\Phi_1^2}{\mu_0 S_{in}} + \frac{1}{2}\frac{\Phi_1^2}{\mu_0 S_{out}},$$

$$\Phi_1 = \frac{N_1 I_{c1}}{R_{total1}},$$

$$S_{out} = \frac{\pi}{4}(d_6^2 - d_5^2),$$

$$S_{in} = \frac{\pi}{4}(r_4^2 - r_3^2),$$

wherein $F_{mag1}$ represents an electromagnetic attraction force of an electromagnet 1; $R_{total1}$ represents a total reluctance of the electromagnet 1; $\Phi_1$ represents a magnetic flux of the electromagnet 1; $\mu_0$ represents permeability of vacuum; $S_{in}$ represents an equivalent cross-sectional area of an inner magnetic pole;

$S_{out}$ represents an equivalent cross-sectional area of an outer magnetic pole; and $I_{c1}$ represents a current passing into the coil 1;

determining the total reluctance of the electromagnet 1 according to an air gap reluctance of an armature 1 and a reluctance of the armature 1, and representing the total reluctance of the electromagnet 1 by the following formulas:

$$R_{total1} = R_{gap11} + R_{gap12} + R_{arm} + R_{iron},$$

$$R_{iron} = \frac{l_b}{\mu_1 S_m} + \frac{l_b}{\mu_1 S_{out}} + \frac{l_a}{\mu_1 S_1},$$

$$R_{arm} = \frac{l_8}{2\mu_1 S_m} + \frac{l_8}{2\mu_1 S_{out}} + \frac{l_d}{\mu_1 S_2},$$

$$R_{gap11} = \frac{x_1}{\mu_0 S_{in}},$$

$$R_{gap12} = \frac{x_1}{\mu_0 S_{out}},$$

$$S_1 = \frac{\pi}{16}(l_1 - l_2)(l_3 + l_4 + l_5 + l_6),$$

$$S_2 = \frac{\pi}{4}l_8(l_3 + l_4 + l_5 + l_6),$$

$$l_a = \frac{l_5 + l_6 - l_3 - l_4}{4},$$

$$l_b = \frac{l_1 + l_2}{2},$$

wherein $S_1$ represents an equivalent cross-sectional area of a magnetic circuit in a horizontal direction of an iron core 1; $S_2$ represents an equivalent cross-sectional area of a magnetic circuit in a horizontal direction of the armature 1; $x_1$ represents an air gap of the electromagnet 1; $\mu_1$ represents a magnetic permeability of materials of the iron core 1, an iron core 2, the armature 1 and an armature 2; $R_{gap11}$ represents an air gap reluctance corresponding to an inner magnetic pole of the armature 1; $R_{gap12}$ represents an air gap reluctance corresponding to an outer magnetic pole of the armature 1; $R_{arm}$ represents the reluctance of the armature 1; $R_{iron}$ represents a reluctance of the iron core 1; $N_1$ represents the number of turns of a coil of the electromagnet 1; $l_1$ represents a height of the iron core 1; $l_2$ represents a height of a coil of the electromagnet 1; $l_3$ represents an inner diameter of the armature 1; $l_4$ represents an inner diameter of the coil of the electromagnet 1; $l_5$ represents an outer diameter of the coil of the electromagnet 1; $l_6$ represents an outer diameter of the iron core 1; $l_7$ represents an outer diameter of the armature 1; and $l_8$ represents a height of the armature 1.

Preferably, the step 3 is specifically as follows:

according to a structure that the negative stiffness electromagnetic actuator is symmetrical up and down, establishing an electromagnetic force-displacement expression of the negative stiffness electromagnetic actuator under the condition of magnetic unsaturation, determining a magnitude of an electromagnetic attraction force of the negative stiffness electromagnetic actuator under ideal conditions, and representing an electromagnetic attraction force under ideal conditions by the following formulas:

$$F_{mag} = F_{mag1} - F_{mag2} = 2N_1^2 I_{c1}^2 \mu_0 S_{in} S_{out}(S_{in} + S_{out})\left[\frac{1}{(ax+b)^2} - \frac{1}{(ax-b)^2}\right],$$

$$F_{mag2} = \frac{1}{2}\frac{\Phi_2^2}{\mu_0 S_{in}} + \frac{1}{2}\frac{\Phi_2^2}{\mu_0 S_{out}},$$

$$a = 2(S_{in} + S_{out}),$$

$$b = \left(\frac{l_8}{\mu_r} + \frac{2l_b}{\mu_r} + 2g\right)(S_{in} + S_{out}) + \frac{2l_a}{\mu_r}S_{in}S_{out}\left(\frac{1}{S_1} + \frac{1}{S_2}\right),$$

wherein $F_{mag2}$ represents an electromagnetic attraction force of an electromagnet 2; $\Phi_2$ represents a magnetic flux of the electromagnet 2; x represents a displacement of a negative stiffness spring; $N_2$ represents the number of turns of a coil of the electromagnet 2; $I_{c1}$ represents a current passing into the coil 1 (a current $I_{c2}$ passing into the coil 2 is equal to the current $I_{c1}$; $\mu_r$ represents a magnitude of a relative magnetic conductivity of materials of an iron core 1, an iron core 2, an armature 1 and an armature 2; a represents an intermediate calculation variable about $S_{in}$ and $S_{out}$; and b represents an intermediate calculation variable about $l_8$, $l_a$, $l_b$, $S_{in}$, $S_{out}$, $S_1$, $S_2$ and $\mu_r$; and determining the magnetic flux of the electromagnet 2 according to the number of turns of the coil and the current of the electromagnet 2 and the total reluctance of the electromagnet 2, and representing the magnetic flux of the electromagnet 2 by the following formulas:

$$\Phi_2 = \frac{N_2 I_2}{R_{total2}},$$

$$R_{total2} = R_{gap21} + R_{gap22} + R_{arm} + R_{iron},$$

$$R_{gap22} = \frac{x_2}{\mu_0 S_{out}},$$

wherein $R_{gap21}$ represents an air gap reluctance corresponding to an inner magnetic pole of the armature 2, and $R_{gap22}$ represents an air gap reluctance corresponding to an outer magnetic pole of the armature 2.

Preferably, the step 4 is specifically as follows:

step 4.1: determining an electromagnetic force-displacement expression of the negative stiffness electromagnetic actuator, and making the electromagnetic force-displacement expression of the negative stiffness electromagnetic actuator about the structural parameter and the control current equal to an electromagnetic force-displacement expression about ideal negative stiffness:

$$F_{mag} = 2N_1^2 I_{c1}^2 \mu_0 S_{in} S_{out}(S_{in} + S_{out})\left[\frac{1}{(ax+b)^2} - \frac{1}{(ax-b)^2}\right] = k_m x,$$

$$F_{mag} = k_m x,$$

wherein $k_m$ represents the magnitude of the ideal constant value negative stiffness;

step 4.2: analyzing the electromagnetic force-displacement expression, and determining the expression about currents passing into upper and lower coils about the displacement, the magnitude of the ideal constant value negative stiffness and the structural parameter when the negative stiffness electromagnetic actuator takes the current as the input control variable of the system:

$$I_{c1} = \frac{1}{2aN_1}\sqrt{\frac{-k_m}{\mu_0 b S_{in} S_{out}}}\sqrt{(ax+b)^2(ax-b)^2},$$

$$ax+b = \left(\frac{r_g}{\mu_r} + \frac{2l_b}{\mu_r} + 2g + 2x\right)(S_{in}+S_{out}) + \frac{2l_a}{\mu_r}S_{in}S_{out}\left(\frac{1}{S_1}+\frac{1}{S_2}\right) > 0,$$

$$b-ax = \left(\frac{r_g}{\mu_r} + \frac{2l_b}{\mu_r} + 2(g-x)\right)(S_{in}+S_{out}) + \frac{2l_a}{\mu_r}S_{in}S_{out}\left(\frac{1}{S_1}+\frac{1}{S_2}\right) > 0,$$

$$ax - b < 0,$$

$$I_{c1} = \frac{1}{2aN_1}\sqrt{\frac{-k_m}{\mu_0 b S_{in} S_{out}}}b^2 - \frac{a}{2N_1}\sqrt{\frac{-k_m}{\mu_0 b S_{in} S_{out}}}x^2 = I_1 - I_2^2,$$

$$I_1 = \frac{1}{2aN_1}\sqrt{\frac{-k_m}{\mu_0 b S_{in} S_{out}}}b^2,$$

$$I_2 = \sqrt{\frac{a}{2N_1}\sqrt{\frac{-k_m}{\mu_0 b S_{in} S_{out}}}}\,x$$

wherein $I_{c1}$ represents a current passing into the coil 1 (a current $I_{c2}$ passing into the coil 2 is equal to the current $I_{c1}$); and $\mu_r$ represents a magnitude of a relative magnetic conductivity of materials of an iron core 1, an iron core 2, an armature 1 and an armature 2.

Preferably, the step 5 is specifically as follows:

step 5.1: establishing a vibration isolation system dynamic formula, and substituting an ideal electromagnetic force form into a dynamic mathematical model of a vibration isolation system by the following formulas:

$$m\ddot{x}_t + c(\dot{x}_t - \dot{x}_e) + k_m(x_t - x_e) + k(x_t - x_e) = 0,$$

$$x_e = X_e \cos(w_e t),$$

$$x = x_t - x_e,$$

wherein m represents a vibration-isolated mass; $\ddot{x}_t$ represents a vibration response acceleration of a vibration-isolated object; $\dot{x}_t$ represents a vibration response speed of the vibration-isolated object; $x_e$ represents a system excitation; $\dot{x}_e$ represents a system excitation speed; c represents a system damping; $x_t$ represents a vibration response of the vibration-isolated object; $X_e$ represents an excitation amplitude; and $w_e$ represents an excitation frequency.

step 5.2: under ideal conditions, when a magnitude of an absolute value of negative stiffness is the same as that of positive stiffness and an overall dynamic stiffness of the system is zero, that is, $k_m + k = 0$ representing a dynamic mathematic model of the vibration isolation system by the following formula:

$$\ddot{x}_t + \frac{c}{m}\dot{x}_t = \frac{-cX_e w_e}{m}\sin(w_e t),$$

determining a displacement response, and representing a vibration response by the following formulas:

$$x_t = x_{t11} + x_{t12}$$

$$x_{t11} = C_1 + C_2 e^{\frac{-c}{m}t},$$

$$C_1 = -X_e,$$

$$C_2 = \frac{X_e m^2 w_e^2}{m^2 w_e^2 + c^2},$$

$$x_{t12} = C_3\cos(w_e t) + C_4\sin(w_e t) = \sqrt{C_3^2 + C_4^2}\sin\left[w_e t + \arctan\left(\frac{C_3}{C_4}\right)\right],$$

$$C_3 = \frac{X_e c^2}{m^2 w_e^2 + c^2},$$

$$C_4 = \frac{cX_e m w_e}{m^2 w_e^2 + c^2},$$

wherein $x_{t11}$ represents a solution corresponding to a free vibration response; $x_{t12}$ represents a particular solution corresponding to a forced vibration response; $C_1$ represents a particular solution coefficient 1 corresponding to the free vibration response; $C_2$ represents a particular solution coefficient 2 corresponding to the free vibration response; $C_3$ represents a particular solution coefficient 1 corresponding to the forced vibration response; and $C_4$ represents a particular solution coefficient 2 corresponding to the forced vibration response; and step 5.3: when stiffness of the negative stiffness mechanism is positive stiffness, that is, $k_m + k > 0$, representing a dynamic mathematic model of the vibration isolation system by the following formula:

$$\ddot{x}_t + \frac{c}{m}\dot{x}_t + \frac{k_m + k}{m}x_t = \frac{k_m + k}{m}X_e\cos(w_e t) - \frac{c}{m}X_e w_e \sin(w_e t),$$

determining a displacement response, and representing the displacement response by the following formulas:

$$x_t = x_{t21} + x_{t22},$$

$$x_{t21} = C_7 e^{\frac{-c}{2m}t}\cos\left(\sqrt{\frac{k_m+k}{m}}\,t\right) + C_8 e^{\frac{-c}{2m}t}\sin\left(\sqrt{\frac{k_m+k}{m} - \frac{c^2}{4m^2}}\,t\right),$$

$$C_7 = \frac{-X_e\left[(k_m+k)(k_m+k-mw_e^2) + c^2 w_e^2\right]}{(k_m+k-mw_e^2)^2 + c^2 w_e^2},$$

$$C_8 = \frac{-cX_e\{2m^2 w_e^4 + [(k_m+k)(k_m+k-mw_e^2) + c^2 w_e^2]\}}{\sqrt{4m(k_m+k)+c^2}\left[(k_m+k-mw_e^2)^2 + c^2 w_e^2\right]},$$

$$x_{t22} = C_9\cos(w_e t) + C_{10}\sin(w_e t) = \sqrt{C_9^2 + C_{10}^2}\sin\left[w_e t + \arctan\left(\frac{C_9}{C_{10}}\right)\right],$$

$$C_9 = \frac{X_e\left[(k_m+k)(k_m+k-mw_e^2) + c^2 w_e^2\right]}{(k_m+k-mw_e^2)^2 + c^2 w_e^2},$$

$$C_{10} = \frac{cmX_e w_e^3}{(k_m+k-mw_e^2)^2 + c^2 w_e^2},$$

wherein $x_{t21}$ represents a solution corresponding to a free vibration response; $x_{t22}$ represents a particular solution corresponding to a forced vibration response; $C_7$ represents a particular solution coefficient 1 corresponding to the free vibration response; $C_8$ represents a particular solution coefficient 2 corresponding to the free vibration response; $C_9$ represents a particular solution coefficient 1 corresponding to the forced vibration response; and $C_{10}$ represents a particular solution coefficient 2 corresponding to the forced vibration response.

Preferably, the step 6 is specifically as follows:

under ideal conditions, when a magnitude of a value of negative stiffness is the same as that of positive stiffness, that is, $k_m = -k$, representing the control current $I_{c1}(I_{c2})$ by the following formulas:

$$I_{c1} = I_1 - (I_{21} + I_{22} + I_{231} - I_{232})^2,$$

$$I_1 = \frac{1}{2aN_1}\sqrt{\frac{-k_m}{\mu_0 b S_{in} S_{out}}} b^2,$$

$$C_0 = \sqrt{\frac{a}{2N_1}\sqrt{\frac{-k_m}{\mu_0 b S_{in} S_{out}}}},$$

$$I_2 = I_{21} + I_{22} + I_{231} - I_{232}$$

$$= \sqrt{\frac{a}{2N_1}\sqrt{\frac{-k_m}{\mu_0 b S_m S_{out}}}} x = C_0 x = C_0(x_t - x_e) = C_0 x_{t11} + C_0 x_{t12} - C_0 x_e$$

$$= C_0 C_1 + C_0 C_2 e^{\frac{-c}{m}t} + C_0 \sqrt{C_3^2 + C_4^2}\sin\left[w_e t + \arctan\left(\frac{C_3}{C_4}\right)\right] - C_0 X_e \cos(w_e t)$$

$$U_{c1} + R_1 I_{22} + L_1 \frac{dI_{22}}{dt} = 0, \left(\frac{c}{m}\right)^2 = \left(\frac{R_1}{2L_1}\right)^2 = \frac{1}{L_1 C_1'} U_{c1}(0) = \left(\frac{c}{m} - R_1\right)C_0 C_2$$

wherein $C'_1$ represents a resistance value of a capacitor; $R_1$ represents a sum of a resistance value of a circuit and a resistance value of a coil; $L_1$ represents an inductance of a circuit 1; $I_1$ represents a control current 1; $I_2$ represents a control current 2; $I_{21}$ represents a component 1 of the control current 2; $I_{22}$ represents a component 2 of the control current 2; $I_{231}$ represents a component 3 of the control current 2; $I_{232}$ represents a component 4 of the control current 2; $C_0$ represents a linear coefficient between the control current $I_2$ and a working displacement x; $U_{c1}$ represents a real-time voltage of a capacitor 1; and $U_{c1}(0)$ represents a voltage before the capacitor 1 starts to work; and when the magnitude of the value of the negative stiffness is less than that of the positive stiffness, that is, $k_m + k > 0$, representing the control current $I_{c1}(I_{c2})$ by the following formulas:

$$I_{c1} = I_1 - I_2'^2 = I_1 - (I_{21}' + I_{22}' + I_{231}' - I_{232}')^2,$$

$$I_1 = \frac{1}{2aN_1}\sqrt{\frac{-k_m}{\mu_0 b S_{in} S_{out}}} b^2,$$

$$I_2' = C_0(x_t - x_e) = C_0 x_{t21} + C_0 x_{t22} - C_0 x_e$$

$$= C_0 C_7 e^{\frac{-c}{2m}t}\cos\left(\sqrt{\frac{k_m+k}{m}}t\right) + C_0 C_8 e^{\frac{-c}{2m}t}\sin\left(\sqrt{\frac{k_m+k}{m} - \frac{c^2}{4m^2}}t\right) +$$

$$C_0\sqrt{C_9^2 + C_{10}^2}\sin\left[w_e t + \arctan\left(\frac{C_9}{C_{10}}\right)\right] - C_0 X_e \cos(w_e t)$$

$$= I_{21}' + I_{22}' + I_{231}' - I_{232}'$$

$$C_0' = \sqrt{\frac{a}{2N_1}\sqrt{\frac{-k_m}{\mu_0 b S_{in} S_{out}}}},$$

$$U_{c2} + R_2 I_{22}' + L_2 \frac{dI_{22}'}{dt} = 0, \frac{c}{2m} = \frac{R_2}{2L_2},$$

$$\frac{k_m+k}{m} = \frac{1}{L_2 C_2'} - \frac{R_2^2}{4L_2^2},$$

$$U_{c2}(0) = \left(\frac{L_2 c}{2m} - R_2\right)C_0' C_7,$$

$$U_{c3} + R_3 I_{23}' + L_3 \frac{dI_{23}'}{dt} = 0,$$

$$\frac{c}{2m} = \frac{R_3}{2L_3},$$

$$\frac{k_m+k}{m} - \frac{c^2}{4m^2} = \frac{1}{L_3 C_3'} - \frac{R_3^2}{4L_3^2},$$

$$U_{c3}(0) = -\sqrt{\frac{k_m+k}{m}} C_0' C_8$$

wherein $C'_2$ represents a resistance value of a capacitor 2; $R_2$ represents a sum of a resistance value of a circuit 2 and a resistance value of a coil; $L_2$ represents an inductance of the circuit 2; $C'_3$ represents a resistance value of a capacitor 3; $R_3$ represents a sum of a resistance value of a circuit 3 and the resistance value of the coil; $L_3$ an inductance of the circuit 3; $I_1$ represents a control current 1; $I'_2$ represents a control current 2'; $I'_{21}$ represents a component 1 of the control current 2'; $I'_{22}$ represents a component 2 of the control current 2'; $I'_{231}$ represents a component 3 of the control current 2'; $I'_{232}$ represents a component 4 of the control current 2'; $C'_0$ represents a linear coefficient between the control current $I'_2$ and a working displacement x; $U_{c2}$ represents a real-time voltage of the capacitor 2; $U_{c2}(0)$ represents a voltage before the capacitor 2 starts to work; $U_{c3}$ represents a real-time voltage of the capacitor 3; and $U_{c3}(0)$ represents a voltage before the capacitor 3 starts to work.

The present disclosure has the following beneficial effects:

the present disclosure aims at the magnetic disk type quasi-zero stiffness vibration isolator and takes the coil current as an input control variable, so that the electromagnetic force and displacement of the negative stiffness electromagnetic actuator have a linear relationship, thereby changing the non-linear nature of the vibration isolation system, avoiding the multi-stable phenomenon caused by non-linear electromagnetic force during working, and eliminating complex dynamic behaviors such as jumping when the whole vibration isolator works.

The linear electromagnetic force control method of the magnetic disk type negative stiffness electromagnetic actuator according to the present disclosure is a semi-active control method. Different from an active control method, complex sensors and control systems are not needed; the input currents are all definite functions changing with time; and the implementation manners are simple and convenient.

DETAILED DESCRIPTION

Figure 1:
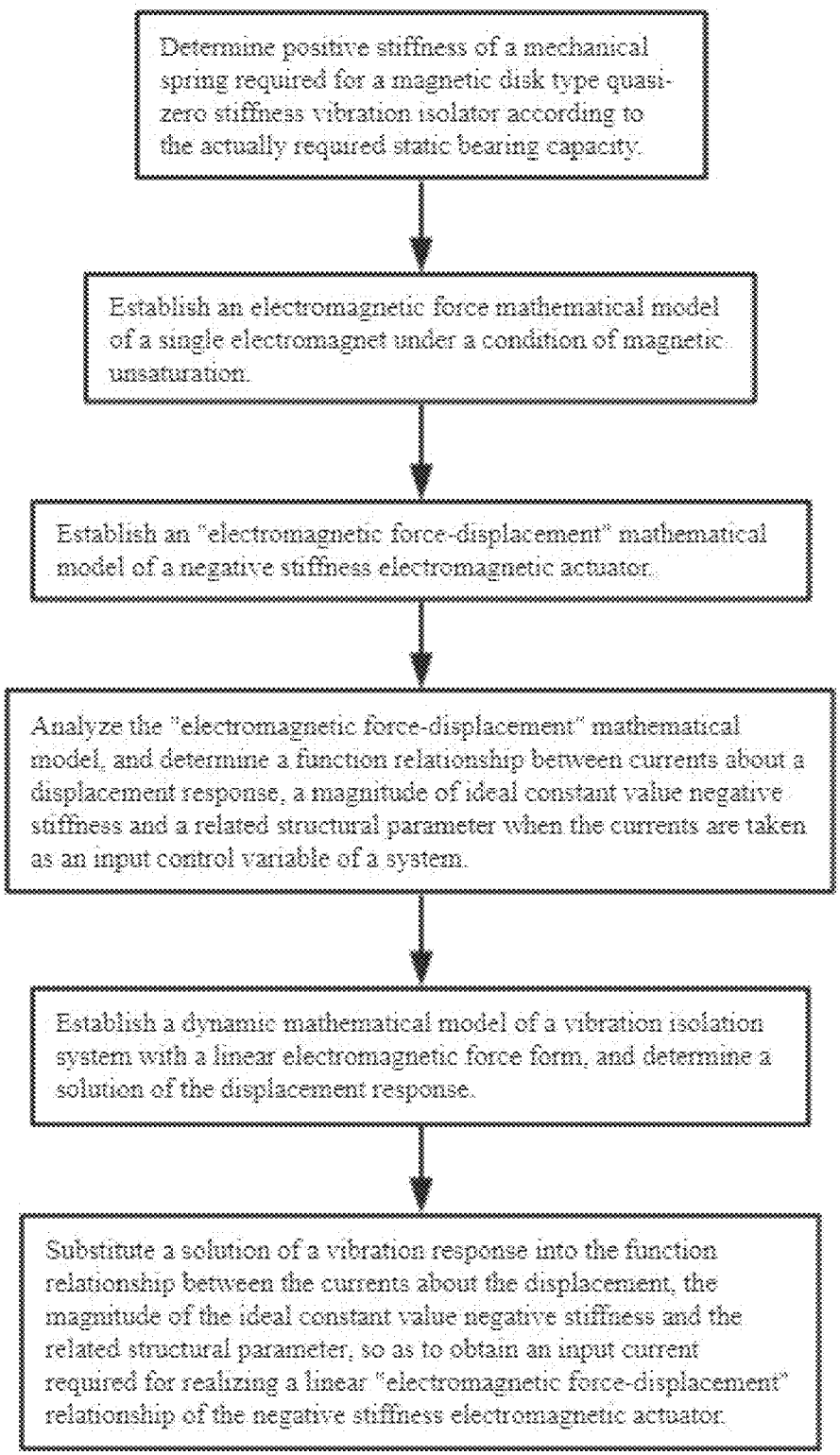
FIG. 1 is a flow diagram of steps of an electromagnetic force control method of a magnetic disk type negative stiffness actuator.
Figure 2:
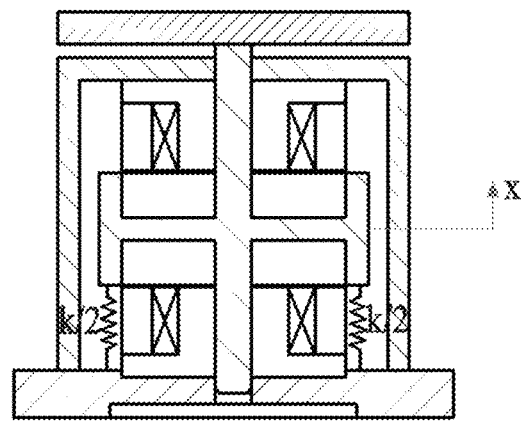
FIG. 2 is a schematic structural diagram of a magnetic disk type quasi-zero stiffness vibration isolator.

The present disclosure is described in detail below with reference to specific embodiments.

Specific Embodiment I

As shown in FIG. 1 to FIG. 7, the present disclosure provides an electromagnetic force control method of the magnetic disk type negative stiffness electromagnetic actuator. The electromagnetic force control method of the magnetic disk type negative stiffness electromagnetic actuator includes the following steps:

Step 1: according to the static bearing capacity, selecting a mechanical spring for providing positive stiffness of a vibration isolation system, and determining the positive stiffness of the spring.

Step 2: establishing an electromagnetic force expression under magnetic unsaturation, and determining an electromagnetic attraction force of an electromagnet.

The step 2 is specifically as follows:

establishing an electromagnetic force expression under magnetic unsaturation, determining an electromagnetic attraction force of an electromagnet, and representing the electromagnetic attraction force of the electromagnet by the following formulas:

$$F_{mag1} = \frac{1}{2}\frac{\Phi_1^2}{\mu_0 S_{in}} + \frac{1}{2}\frac{\Phi_1^2}{\mu_0 S_{out}},$$

$$\Phi_1 = \frac{N_1 I_{c1}}{R_{total1}},$$

$$S_{out} = \frac{\pi}{4}(d_6^2 - d_5^2),$$

$$S_{in} = \frac{\pi}{4}(r_4^2 - r_3^2),$$

wherein $F_{mag1}$ represents an electromagnetic attraction force of an electromagnet 1; $R_{total1}$ represents a total reluctance of the electromagnet 1; $\Phi_1$ represents a magnetic flux of the electromagnet 1; $\mu_0$ represents permeability of vacuum; $S_{in}$ represents an equivalent cross-sectional area of an inner magnetic pole; $S_{out}$ represents an equivalent cross-sectional area of an outer magnetic pole; and $I_{c1}$ represents a current passing into the coil 1; and determining the total reluctance of the electromagnet 1 according to an air gap reluctance of an armature 1 and a reluctance of the armature 1, and representing the total reluctance of the electromagnet 1 by the following formulas:

$$R_{total1} = R_{gap11} + R_{gap12} + R_{arm} + R_{iron},$$

$$R_{iron} = \frac{l_b}{\mu_1 S_{in}} + \frac{l_b}{\mu_1 S_{out}} + \frac{l_a}{\mu_1 S_1},$$

$$R_{arm} = \frac{l_8}{2\mu_1 S_{in}} + \frac{l_8}{2\mu_1 S_{out}} + \frac{l_d}{\mu_1 S_2},$$

$$R_{gap11} = \frac{x_1}{\mu_0 S_{in}},$$

$$R_{gap12} = \frac{x_1}{\mu_0 S_{out}},$$

$$S_1 = \frac{\pi}{16}(l_1 - l_2)(l_3 + l_4 + l_5 + l_6),$$

$$S_2 = \frac{\pi}{4}l_8(l_3 + l_4 + l_5 + l_6),$$

$$l_a = \frac{l_5 + l_6 - l_3 - l_4}{4},$$

$$l_b = \frac{l_1 + l_2}{2},$$

wherein $S_1$ represents an equivalent cross-sectional area of a magnetic circuit in a horizontal direction of an iron core 1; $S_2$ represents an equivalent cross-sectional area of a magnetic circuit in a horizontal direction of the armature 1; $x_1$ represents an air gap of the electromagnet 1; $\mu_1$ represents a magnetic permeability of materials of the iron core 1, an iron core 2, the armature 1 and an armature 2; $R_{gap11}$ represents an air gap reluctance corresponding to an inner magnetic pole of the armature 1; $R_{gap12}$ represents an air gap reluctance corresponding to an outer magnetic pole of the armature 1; $R_{arm}$ represents the reluctance of the armature 1; $R_{iron}$ represents a reluctance of the iron core 1; $N_1$ represents the number of turns of a coil of the electromagnet 1; $l_1$ represents a height of the iron core 1; $l_2$ represents a height of a coil of the electromagnet 1; $l_3$ represents an inner diameter of the armature 1; $l_4$ represents an inner diameter of the coil of the electromagnet 1; $l_5$ represents an outer diameter of the coil of the electromagnet 1; $l_6$ represents an outer diameter of the iron core 1; $l_7$ represents an outer diameter of the armature 1; and $l_8$ represents a height of the armature 1.

Step 3: enabling a negative stiffness electromagnetic actuator to be symmetrical up and down, establishing an electromagnetic force-displacement expression according to the negative stiffness electromagnetic actuator under a condition of magnetic unsaturation, and determining an electromagnetic attraction force of the negative stiffness electromagnetic actuator under ideal conditions.

The step 3 is specifically as follows:

according to a structure that the negative stiffness electromagnetic actuator is symmetrical up and down, establishing an electromagnetic force-displacement expression of the negative stiffness electromagnetic actuator under the condition of magnetic unsaturation, determining an electromagnetic attraction force of the negative stiffness electromagnetic actuator under ideal conditions, and representing an electromagnetic attraction force under ideal conditions by the following formulas:

$$F_{mag} = F_{mag1} - F_{mag2} = 2N_1^2 I_{c1}^2 \mu_0 S_{in} S_{out}(S_{in} + S_{out}) \left[ \frac{1}{(ax+b)^2} - \frac{1}{(ax-b)^2} \right],$$

$$F_{mag2} = \frac{1}{2} \frac{\Phi_2^2}{\mu_0 S_{in}} + \frac{1}{2} \frac{\Phi_2^2}{\mu_0 S_{out}},$$

$$a = 2(S_{in} + S_{out}),$$

$$b = \left( \frac{l_g}{\mu_r} + \frac{2l_b}{\mu_r} + 2g \right)(S_{in} + S_{out}) + \frac{2l_a}{\mu_r} S_{in} S_{out} \left( \frac{1}{S_1} + \frac{1}{S_2} \right),$$

wherein $F_{mag2}$ represents an electromagnetic attraction force of an electromagnet 2; $\Phi_2$ represents a magnetic flux of the electromagnet 2; x represents a displacement of a negative stiffness spring; $N_2$ represents the number of turns of a coil of the electromagnet 2; $I_2$ represents currents passing into a electromagnet 2; $\mu_r$ represents a magnitude of a relative magnetic conductivity of materials of an iron core 1, an iron core 2, an armature 1 and an armature 2; a represents an intermediate calculation variable about $S_{in}$ and $S_{out}$; and b represents an intermediate calculation variable about $l_g$, $l_a$, $l_b$, $S_{in}$, $S_{out}$, $S_1$, $S_2$ and $\mu_r$;

determining the magnetic flux of the electromagnet 2 according to the number of turns of the coil and the current of the electromagnet 2 and the total reluctance of the electromagnet 2, and representing the magnetic flux of the electromagnet 2 by the following formulas:

$$\Phi_2 = \frac{N_2 I_2}{R_{total2}},$$

$$R_{total2} = R_{gap21} + R_{gap22} + R_{arm} + R_{iron},$$

$$R_{gap22} = \frac{x_2}{\mu_0 S_{out}},$$

wherein $R_{gap21}$ represents an air gap reluctance corresponding to an inner magnetic pole of the armature 2, and $R_{gap22}$ represents an air gap reluctance corresponding to an outer magnetic pole of the armature 2.

Step 4: analyzing the electromagnetic force-displacement expression, and determining an expression about currents passing into upper and lower coils about a displacement, a magnitude of ideal constant value negative stiffness and a structural parameter when the negative stiffness electromagnetic actuator takes the current as an input control variable of a system.

The step 4 is specifically as follows:

Step 4.1: determining an electromagnetic force-displacement expression of the negative stiffness electromagnetic actuator, and making the electromagnetic force-displacement expression of the negative stiffness electromagnetic actuator equal to an electromagnetic force-displacement relationship of the negative stiffness electromagnetic actuator:

$$F_{mag} = 2N_1^2 I_{c1}^2 \mu_0 S_{in} S_{out}(S_{in} + S_{out}) \left[ \frac{1}{(ax+b)^2} - \frac{1}{(ax-b)^2} \right] = k_m x,$$

$$F_{mag} = k_m x,$$

wherein $k_m$ represents the magnitude of the ideal constant value negative stiffness.

Step 4.2: analyzing the electromagnetic force-displacement expression, and determining the expression about currents passing into upper and lower coils about the displacement, the magnitude of the ideal constant value negative stiffness and the structural parameter when the negative stiffness electromagnetic actuator takes the current as the input control variable of the system:

$$I_{c1} = \frac{1}{2aN_1} \sqrt{\frac{-k_m}{\mu_0 b S_{in} S_{out}}} \sqrt{(ax+b)^2(ax-b)^2},$$

$$ax + b = \left( \frac{l_g}{\mu_r} + \frac{2l_b}{\mu_r} + 2g + 2x \right)(S_{in} + S_{out}) + \frac{2l_a}{\mu_r} S_{in} S_{out} \left( \frac{1}{S_1} + \frac{1}{S_2} \right) > 0,$$

$$b - ax = \left( \frac{l_g}{\mu_r} + \frac{2l_b}{\mu_r} + 2(g-x) \right)(S_{in} + S_{out}) + \frac{2l_a}{\mu_r} S_{in} S_{out} \left( \frac{1}{S_1} + \frac{1}{S_2} \right) > 0,$$

$$ax - b < 0,$$

$$I_{c1} = \frac{1}{2aN_1} \sqrt{\frac{-k_m}{\mu_0 b S_{in} S_{out}}} b^2 - \frac{a}{2N_1} \sqrt{\frac{-k_m}{\mu_0 b S_{in} S_{out}}} x^2 = I_1 - I_2^2,$$

$$I_1 = \frac{1}{2aN_1} \sqrt{\frac{-k_m}{\mu_0 b S_{in} S_{out}}} b^2, \ I_2 = \sqrt{\frac{a}{2N_1} \sqrt{\frac{-k_m}{\mu_0 b S_{in} S_{out}}}} x,$$

wherein $I_{c1}(I_{c2}=I_{c1})$ represents currents passing into the coil 1 and the coil 2 at the same time.

Step 5: establishing a vibration isolation system dynamic formula, and determining a vibration response according to the electromagnetic attraction force of the negative stiffness electromagnetic actuator under ideal conditions.

The step 5 is specifically as follows:

Step 5.1: establishing a vibration isolation system dynamic formula, and substituting an ideal electromagnetic force form into a dynamic mathematical model of a vibration isolation system by the following formulas:

$$m\ddot{x} + c(\dot{x}_t - \dot{x}_e) + k_m(x_t - x_e) + k(x_t - x_e) = 0,$$

$$x_e = X_e \cos(w_e t),$$

$$x = x_t - x_e,$$

wherein m represents a vibration-isolated mass; $\ddot{x}_t$ represents a vibration response acceleration of a vibration-isolated object; $\dot{x}_t$ represents a vibration response speed of the vibration-isolated object; $x_e$ represents a system excitation; $\dot{x}_e$ represents a system excitation speed; c represents a system damping; $x_t$ represents a vibration response of the vibration-isolated object; $X_e$ represents an excitation amplitude; and $w_e$ represents an excitation frequency.

Step 5.2: under ideal conditions, when a magnitude of an absolute value of negative stiffness is the same as that of positive stiffness and an overall dynamic stiffness of the system is zero, that is, $k_m + k = 0$, representing a dynamic mathematic model of the vibration isolation system by the following formula:

$$\ddot{x}_t + \frac{c}{m}\dot{x}_t = \frac{-cX_e w_e}{m}\sin(w_e t),$$

determining a displacement response, and representing a vibration response by the following formulas:

$$x_t = x_{t11} + x_{t12}$$

$$x_{t11} = C_1 + C_2 e^{\frac{-c}{m}t},$$

$$C_1 = -X_e, \quad C_2 = \frac{X_e m^2 w_e^2}{m^2 w_e^2 + c^2},$$

$$x_{t12} = C_3\cos(w_e t) + C_4\sin(w_e t) = \sqrt{C_3^2 + C_4^2}\sin\left[w_e t + \arctan\left(\frac{C_3}{C_4}\right)\right],$$

$$C_3 = \frac{X_e c^2}{m^2 w_e^2 + c^2}, \quad C_4 = \frac{cX_e m w_e}{m^2 w_e^2 + c^2},$$

wherein $x_{t11}$ represents a solution corresponding to a free vibration response; $x_{t12}$ represents a particular solution corresponding to a forced vibration response; $C_1$ represents a particular solution coefficient 1 corresponding to the free vibration response; $C_2$ represents a particular solution coefficient 2 corresponding to the free vibration response; $C_3$ represents a particular solution coefficient 1 corresponding to the forced vibration response; and $C_4$ represents a particular solution coefficient 2 corresponding to the forced vibration response.

Step 5.3: when stiffness of the negative stiffness mechanism is positive stiffness, that is, $k_m+k>0$, representing a dynamic mathematic model of the vibration isolation system by the following formula:

$$\ddot{x}_t + \frac{c}{m}\dot{x}_t + \frac{k_m+k}{m}x_t = \frac{k_m+k}{m}X_e\cos(w_e t) - \frac{c}{m}X_e w_e\sin(w_e t),$$

determining a displacement response, and representing the displacement response by the following formulas:

$$x_t = x_{t21} + x_{t22},$$

$$x_{t21} = C_7 e^{\frac{-c}{2m}t}\cos\left(\sqrt{\frac{k_m+k_d}{m}}\,t\right) + C_8 e^{\frac{-c}{2m}t}\sin\left(\sqrt{\frac{k_m+k}{m} - \frac{c^2}{4m^2}}\,t\right),$$

$$C_7 = \frac{-X_e\left[(k_m+k)(k_m+k-mw_e^2) + c^2 w_e^2\right]}{(k_m+k-mw_e^2)^2 + c^2 w_e^2},$$

$$C_8 = \frac{-cX_e\{2m^2 w_e^4 + \left[(k_m+k)(k_m+k-mw_e^2) + c^2 w_e^2\right]\}}{\sqrt{4m(k_m+k) + c^2}\left[(k_m+k-mw_e^2)^2 + c^2 w_e^2\right]},$$

$$x_{t22} = C_9\cos(w_e t) + C_{10}\sin(w_e t) = \sqrt{C_9^2 + C_{10}^2}\sin\left[w_e t + \arctan\left(\frac{C_9}{C_{10}}\right)\right],$$

$$C_9 = \frac{X_e\left[(k_m+k)(k_m+k-mw_e^2) + c^2 w_e^2\right]}{(k_m+k-mw_e^2)^2 + c^2 w_e^2},$$

$$C_{10} = \frac{cmX_e w_e^3}{(k_m+k-mw_e^2)^2 + c^2 w_e^2},$$

wherein $x_{t21}$ represents a solution corresponding to a free vibration response; $x_{t22}$ represents a particular solution corresponding to a forced vibration response; $C_7$ represents a particular solution coefficient 1 corresponding to the free vibration response; $C_8$ represents a particular solution coefficient 2 corresponding to the free vibration response; $C_9$ represents a particular solution coefficient 1 corresponding to the forced vibration response; and $C_{10}$ represents a particular solution coefficient 2 corresponding to the forced vibration response.

Step 6: according to the vibration response and based on the expression about currents about a displacement, a magnitude of ideal constant value negative stiffness and a structural parameter, determining a control current required for meeting a linear electromagnetic force-displacement relationship of a negative stiffness electromagnetic actuator.

The step 6 is specifically as follows:

under ideal conditions, when a magnitude of a value of negative stiffness is the same as that of positive stiffness, that is, $k_m=-k$, representing the control current $I_{c1}(I_{c2})$ by the following formulas:

$$I_{c1} = I_1 - (I_{21} + I_{22} + I_{231} - I_{232})^2,$$

$$I_1 = \frac{1}{2aN_1}\sqrt{\frac{-k_m}{\mu_0 bS_{in}S_{out}}}\,b^2,$$

$$I_2 = I_{21} + I_{22} + I_{231} - I_{232}$$

$$= \sqrt{\frac{a}{2N_1}}\sqrt{\frac{-k_m}{\mu_0 bS_{in}S_{out}}} = C_0 x = C_0(x_t - x_e) = C_0 x_{t11} + C_0 x_{t12} - C_0 x_e,$$

$$= C_0 C_1 + C_0 C_2 e^{\frac{-c}{m}t} + C_0\sqrt{C_3^2 + C_4^2}\sin\left[w_e t + \arctan\left(\frac{C_3}{C_4}\right)\right] - C_0 X_e\cos(w_e t)$$

$$= U_{c1} + R_1 I_{22} + L_1\frac{dI_{22}}{dt} = 0,\ \left(\frac{c}{m}\right)^2 = \left(\frac{R_1}{2L_1}\right)^2 = \frac{1}{L_1 C_1'},\ U_{c1}(0) = \left(\frac{c}{m} - R_1\right)C_0 C_2,$$

wherein $C'_1$ represents a resistance value of a capacitor; $R_1$ represents a sum of a resistance value of a circuit and a resistance value of a coil; $L_1$ represents an inductance of a circuit 1; $I_1$ represents a control current 1; $I_2$ represents a control current 2; $I_{21}$ represents a component 1 of the control current 2; $I_{22}$ represents a component 2 of the control current 2; $I_{231}$ represents a component 3 of the control current 2; $I_{232}$ represents a component 4 of the control current 2; $C_0$ represents a linear coefficient between the control current $I_2$ and a working displacement x; $U_{c1}$ represents a real-time voltage of a capacitor 1; and $U_{c1}(0)$ represents a voltage before the capacitor 1 starts to work; and when the magnitude of the value of the negative stiffness is less than that of the positive stiffness, that is, $k_m+k>0$, representing the control current $I_{c1}(I_{c2})$ by the following formulas:

$$I_{c1} = I_1 - I_2'^2 = I_1 - (I_{21}' + I_{22}' + I_{231}' - I_{232}')^2,$$

$$I_1 = \frac{1}{2aN_1}\sqrt{\frac{-k_m}{\mu_0 b S_{in} S_{out}}} b^2,$$

$$I_2' = C_0'(x_t - x_e) = C_0' x_{t21} + C_0' x_{t22} - C_0' x_e$$

$$= C_0' C_7 e^{\frac{-c}{2m}t} \cos\left(\sqrt{\frac{k_m+k}{m}} t\right) + C_0' C_8 e^{\frac{-c}{2m}t} \sin\left(\sqrt{\frac{k_m+k}{m} - \frac{c^2}{4m^2}} t\right)$$

$$+ C_0' \sqrt{C_9^2 + C_{10}^2} \sin\left[w_e t + \arctan\left(\frac{C_9}{C_{10}}\right)\right] - C_0' X_e \cos(w_e t)$$

$$= I_{21}' + I_{22}' + I_{231}' - I_{232}'$$

$$C_0' = \sqrt{\frac{a}{2N_1}}\sqrt{\frac{-k_m}{\mu_0 b S_{in} S_{out}}},$$

$$U_{c2} + R_2 I_{22}' + L_2 \frac{dI_{22}'}{dt} = 0, \frac{c}{2m} = \frac{R_2}{2L_2}, \frac{k_m+k}{m} = \frac{1}{L_2 C_2'} - \frac{R_2^2}{4L_2^2}, U_{c2}(0) = \left(\frac{L_2 c}{2m} - R_2\right) C_0' C_7,$$

$$U_{c3} + R_3 I_{23}' + L_3 \frac{dI_{23}'}{dt} = 0, \frac{c}{2m} = \frac{R_3}{2L_3}, \frac{k_m+k}{m} - \frac{c^2}{4m^2} = \frac{1}{L_3 C_3'} - \frac{R_3^2}{4L_3^2}, U_{c3}(0) = -\sqrt{\frac{k_m+k}{m}} C_0' C_8,$$

wherein $C'_2$ represents a resistance value of a capacitor 2; $R_2$ represents a sum of a resistance value of a circuit 2 and a resistance value of a coil; $L_2$ represents an inductance of the circuit 2; $C'_3$ represents a resistance value of a capacitor 3; $R_3$ represents a sum of a resistance value of a circuit 3 and the resistance value of the coil; $L_3$ represents an inductance of the circuit 3; $I_1$ represents a control current 1; $I'_2$ represents a control current 2'; $I'_{21}$ represents a component 1 of the control current 2'; $I'_{22}$ represents a component 2 of the control current 2'; $I'_{231}$ represents a component 3 of the control current 2'; $I'_{232}$ represents a component 4 of the control current 2'; $C'_0$ represents a linear coefficient between the control current $I'_2$; and a working displacement x; $U_{c2}$ represents a real-time voltage of the capacitor 2; $U_{c2}(0)$ represents a voltage before the capacitor 2 starts to work; $U_{c3}$ represents a real-time voltage of the capacitor 3; and $U_{c3}(0)$ represents a voltage before the capacitor 3 starts to work.

Specific Embodiment II

An electromagnetic force control method of a magnetic disk type negative stiffness electromagnetic actuator includes the following steps:

S1: according to the actually required static bearing capacity, reasonably selecting a mechanical spring for providing positive stiffness of a vibration isolation system, and determining a magnitude of the positive stiffness of the mechanical spring as k.

Figure 3:
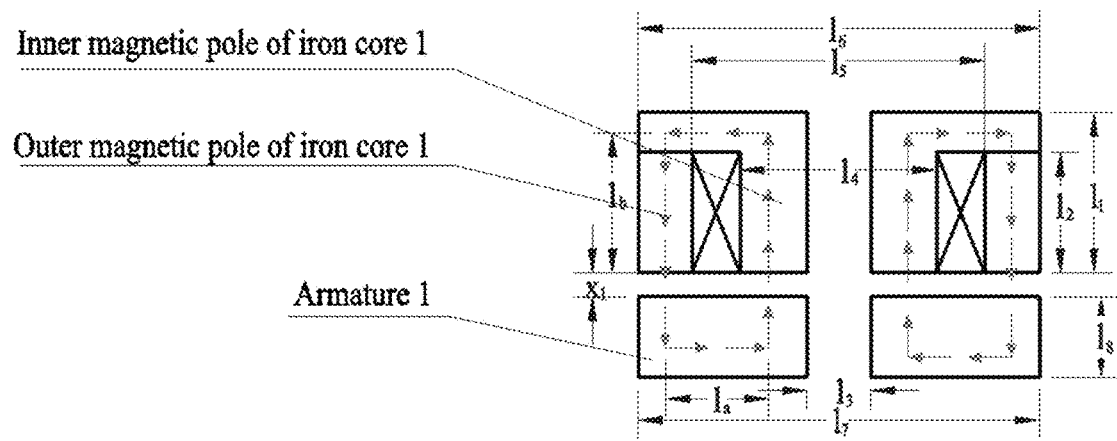
FIG. 3 is a schematic diagram of a magnetic circuit model of a single electromagnet.

S2: establishing a magnetic circuit model of a single electromagnet, as shown in FIG. 3, and establishing an electromagnetic force mathematical model under a condition of magnetic unsaturation, as shown in formula (1-1) to formula (1-13):

$$F_{mag1} = \frac{1}{2}\frac{\Phi_1^2}{\mu_0 S_{in}} + \frac{1}{2}\frac{\Phi_1^2}{\mu_0 S_{out}}, \quad (1\text{-}1)$$

$$S_{in} = \frac{\pi}{4}(l_4^2 - l_3^2), \quad (1\text{-}2)$$

-continued $$S_{out} = \frac{\pi}{4}(l_6^2 - l_5^2), \quad (1\text{-}3)$$

$$S_1 = \frac{\pi}{16}(l_1 - l_2)(l_3 + l_4 + l_5 + l_6), \quad (1\text{-}4)$$

$$S_2 = \frac{\pi}{4}l_8(l_3 + l_4 + l_5 + l_6), \quad (1\text{-}5)$$

$$l_a = \frac{l_5 + l_6 - l_3 - l_4}{4}, \quad (1\text{-}6)$$

$$l_b = \frac{l_1 + l_2}{2}, \quad (1\text{-}7)$$

$$R_{gap11} = \frac{x_1}{\mu_0 S_{in}}, \quad (1\text{-}8)$$

$$R_{gap12} = \frac{x_1}{\mu_0 S_{out}}, \quad (1\text{-}9)$$

$$R_{arm} = \frac{l_8}{2\mu_1 S_{in}} + \frac{l_8}{2\mu_1 S_{out}} + \frac{l_d}{\mu_1 S_2}, \quad (1\text{-}10)$$

$$R_{iron} = \frac{l_b}{\mu_1 S_{in}} + \frac{l_b}{\mu_1 S_{out}} + \frac{l_a}{\mu_1 S_1}, \quad (1\text{-}11)$$

$$R_{total1} = R_{gap11} + R_{gap21} + R_{arm} + R_{iron}, \quad (1\text{-}12)$$

$$\Phi_1 = \frac{N_1 I_{c1}}{R_{total1}}, \quad (1\text{-}13)$$

wherein $F_{mag1}$ represents an electromagnetic attraction force of an electromagnet 1; $\Phi_1$ represents a magnetic flux of the electromagnet 1; $\mu_0$ represents permeability of vacuum; $\mu_1$ represents a magnetic permeability of materials of an iron core 1, an iron core 2, an armature 1 and an armature 2; $S_{in}$ represents an equivalent cross-sectional area of an inner magnetic pole; $S_{out}$ represents an equivalent cross-sectional area of an outer magnetic pole; $S_1$ represents an equivalent cross-sectional area of a magnetic circuit in a horizontal direction of the iron core 1; $S_2$ represents an equivalent cross-sectional area of a magnetic circuit in a horizontal direction of the armature 1; $x_1$ represents an air gap of the electromagnet 1; $R_{gap11}$ represents an air gap reluctance corresponding to an inner magnetic pole of the armature 1; $R_{gap12}$ represents an air gap reluctance corresponding to an outer magnetic pole of the armature 1; $R_{arm}$ represents a reluctance of the armature 1; $R_{iron}$ represents a reluctance of the iron core 1; $R_{total1}$ represents a total reluctance of the electromagnet 1; $N_1$ represents the number of turns of a coil of the electromagnet 1; $I_{c1}$ represents the current passing into the electromagnet 1, as shown in FIG. 3; $l_1$ represents a height of the iron core 1; $l_2$ represents a height of the coil of the electromagnet 1; $l_3$ represents an inner diameter of the armature 1; $l_4$ represents an inner diameter of the coil of the electromagnet 1; $l_5$ represents an outer diameter of the coil of the electromagnet 1; $l_6$ represents an outer diameter of the iron core 1; $l_7$ represents an outer diameter of the armature 1, and $l_8$ represents a height of the armature 1.

Figure 4:
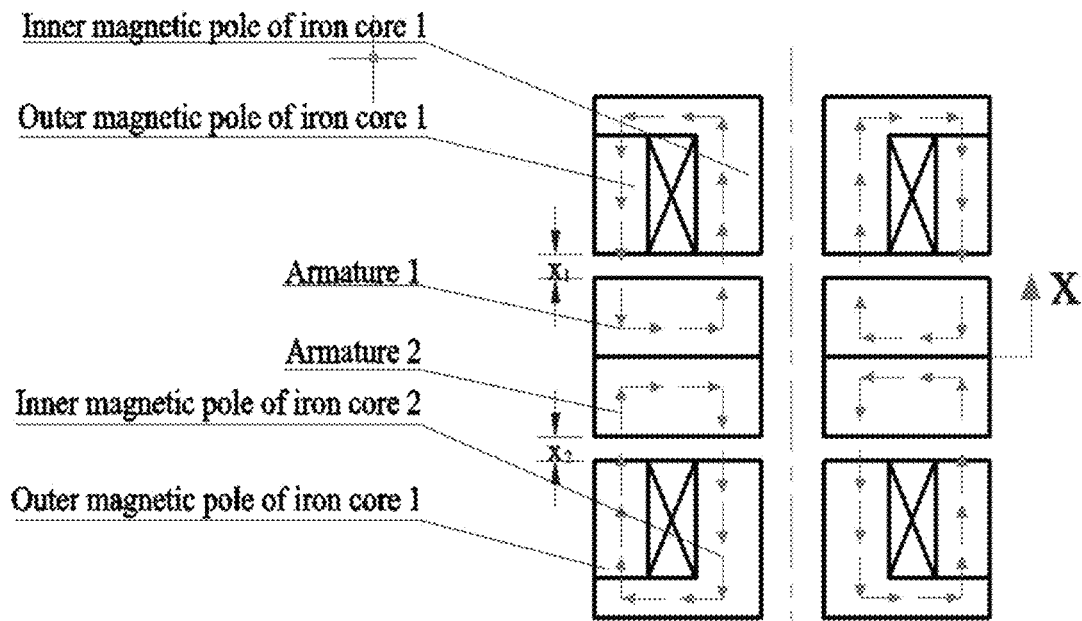
FIG. 4 is a schematic diagram of a negative stiffness electromagnetic actuator.

S3: according to a structural characteristic that the negative stiffness electromagnetic actuator is symmetrical up and down as shown in FIG. 4, establishing an "electromagnetic force-displacement" mathematical model of the negative stiffness electromagnetic actuator under the condition of magnetic unsaturation on the basis of step S2, as shown in formula (2-1).

$$F_{mag} = \tag{2-1}$$

$$F_{mag1} - F_{mag2} = 2N_1^2 I_{c1}^2 \mu_0 S_{in} S_{out} (S_{in} + S_{out}) \left[ \frac{1}{(ax+b)^2} - \frac{1}{(ax-b)^2} \right],$$

$$F_{mag2} = \frac{1}{2} \frac{\Phi_2^2}{\mu_0 S_{in}} + \frac{1}{2} \frac{\Phi_2^2}{\mu_0 S_{out}}, \tag{2-2}$$

$$R_{gap21} = \frac{x_2}{\mu_0 S_{in}}, \tag{2-3}$$

$$R_{gap22} = \frac{x_2}{\mu_0 S_{out}}, \tag{2-4}$$

$$R_{total2} = R_{gap21} + R_{gap22} + R_{arm} + R_{iron}, \tag{2-5}$$

$$\Phi_2 = \frac{N_2 I_{c2}}{R_{total2}}, \tag{2-6}$$

$$a = 2(S_{in} + S_{out}), \tag{2-7}$$

$$b = \left( \frac{l_8}{\mu_r} + \frac{2l_b}{\mu_r} + 2g \right)(S_{in} + S_{out}) + \frac{2l_a}{\mu_r} S_{in} S_{out} \left( \frac{1}{S_1} + \frac{1}{S_2} \right), \tag{2-8}$$

wherein $F_{mag2}$ represents an electromagnetic attraction force of an electromagnet 2; $\Phi_2$ represents a magnetic flux of the electromagnet 2; $R_{gap21}$ represents an air gap reluctance corresponding to an inner magnetic pole of an armature 2; $R_{gap22}$ represents an air gap reluctance corresponding to an outer magnetic pole of the armature 2; $R_{total2}$ represents a total reluctance of the electromagnet 2; $x_1$ represents an air gap of the electromagnet 1; $x_2$ represents an air gap of the electromagnet 2; x represents a displacement of a negative stiffness spring; g represents a maximum value of a unilateral air gap; $x_1 = x+g$, $x_2 = 2g-x_1 = g-x$; $S_1$ represents an equivalent cross-sectional area of a magnetic circuit in a horizontal direction of an iron core 1; $S_2$ represents an equivalent cross-sectional area of a magnetic circuit in a horizontal direction of the armature 1; $\mu_r$ represents a magnitude of a relative magnetic conductivity of materials of the iron core 1, the iron core 2, the armature 1 and the armature 2; a represents an intermediate calculation variable about $S_{in}$ and $S_{out}$; b represents an intermediate calculation variable about $l_g$, $l_a$, $l_b$, $S_{in}$, $S_{out}$, $S_1$, $S_2$ and $\mu_r$; $N_2$ represents the number of turns of a coil of the electromagnet 2; in this embodiment, $N_2 = N_1$; $I_{c2}$ represents the current passing into the electromagnet 2; in this embodiment, $I_{c2} = I_{c1}$; and when the negative stiffness spring is in a static balance position after being energized, the distribution of magnetic lines is as shown in FIG. 4.

S4: in order to enable a vibration-isolated object to have linear dynamic characteristics, making the "electromagnetic force-displacement" relationship of the negative stiffness electromagnetic actuator as shown in formula (3-1) equal to the "electromagnetic force-displacement" mathematical model of the negative stiffness electromagnetic actuator as shown in the above-mentioned formula (2-1), as shown in formula (3-2), analyzing the "electromagnetic force-displacement" mathematical model of the negative stiffness electromagnetic actuator under a condition of magnetic unsaturation, and determining an expression about currents passing into upper and lower coils about a displacement, a magnitude of ideal constant value negative stiffness and a related structural parameter when the currents are taken as an input control variable of a system, as shown in formulas (3-3), (3-4) and (3-5), wherein when the magnitude of the ideal constant value negative stiffness and the related structural parameter are determined, the current is a function about the displacement, that is, a function about the time, as shown in formulas (3-6) and (3-7).

$$F_{mag} = 2N_1^2 I_{c1}^2 \mu_0 S_{in} S_{out} (S_{in} + S_{out}) \left[ \frac{1}{(ax+b)^2} - \frac{1}{(ax-b)^2} \right] = k_m x, \tag{3-1}$$

$$F_{mag} = k_m x, \tag{3-2}$$

$$I_{c1} = \frac{1}{2aN_1} \sqrt{\frac{-k_m}{\mu_0 b S_{in} S_{out}}} \sqrt{(ax+b)^2 (ax-b)^2}, \tag{3-3}$$

$$ax + b = \left( \frac{l_8}{\mu_r} + \frac{2l_b}{\mu_r} + 2g + 2x \right)(S_{in} + S_{out}) + \frac{2l_a}{\mu_r} S_{in} S_{out} \left( \frac{1}{S_1} + \frac{1}{S_2} \right) > 0, \tag{3-4}$$

$$b - ax = \left( \frac{l_8}{\mu_r} + \frac{2l_b}{\mu_r} + 2(g-x) \right)(S_{in} + S_{out}) + \frac{2l_a}{\mu_r} S_{in} S_{out} \left( \frac{1}{S_1} + \frac{1}{S_2} \right) > 0, \tag{3-5}$$

$$I_{c1} = \frac{1}{2aN_1} \sqrt{\frac{-k_m}{\mu_0 b S_{in} S_{out}}} b^2 - \frac{a}{2N_1} \sqrt{\frac{-k_m}{\mu_0 b S_{in} S_{out}}} x^2, \tag{3-6}$$

$$I_1 = \frac{1}{2aN_1} \sqrt{\frac{-k_m}{\mu_0 b S_{in} S_{out}}} b^2, I_2 = \sqrt{\frac{a}{2N_1} \sqrt{\frac{-k_m}{\mu_0 b S_{in} S_{out}}}} x, \tag{3-7}$$

wherein $k_m$ represents a magnitude of an ideal constant value negative stiffness.

Figure 5:
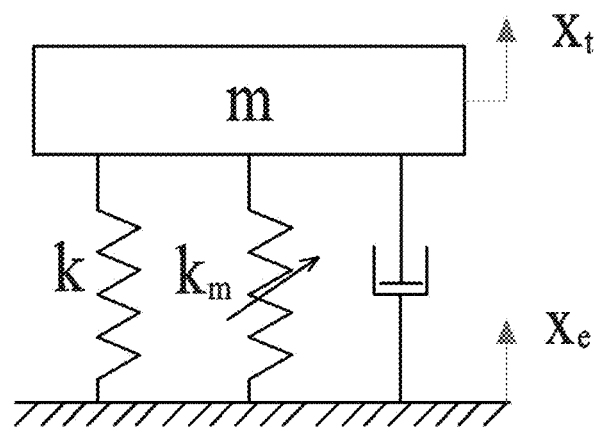
FIG. 5 is a schematic diagram of a vibration isolation system model.

S5: establishing a vibration isolation system model as shown in FIG. 5, and substituting an ideal electromagnetic force form as shown in formula (3-1) into the dynamic mathematical model of the vibration isolation system, as shown in formula (4-1), wherein when the excitation $x_e$ is determined, a solution of a vibration response is obtained by taking $x_t(0)=0$ and $\ddot{x}_t(0)=0$ as equation conditions.

$$m\ddot{x}_t + c(\dot{x}_t - \dot{x}_e) + k_m(x_t - x_e) + k(x_t - x_e) = 0 \tag{4-1},$$

wherein m represents a vibration-isolated mass; k represents positive stiffness of the system; c represents a system damping; $x_t$ represents a vibration response of a vibration-isolated object; $\ddot{x}_t$ represents a vibration response acceleration of the vibration-isolated object; $\dot{x}_t$ represents a vibration response speed of the vibration-isolated object; $x_e$ represents a system excitation; $\dot{x}_e$ represents a system excitation speed; $X_e$ represents an excitation amplitude; $w_e$ represents an excitation frequency; $x_e = X_e \cos(w_e t)$, $x = x_t - x_e$.

Under ideal conditions, when the magnitude of the absolute value of the negative stiffness is the same as that of the positive stiffness and the overall dynamic stiffness of the system is zero, that is, $k_m + k = 0$, a dynamic mathematical model of the vibration isolation system is shown in formula (4-2), and the vibration response of the system is solved as shown in formulas (4-3) to (4-7):

$$\ddot{x}_t + \frac{c}{m}\dot{x}_t = \frac{-cX_e w_e}{m}\sin(w_e t), \tag{4-2}$$

$$x_t = x_{t11} + x_{t12}, \tag{4-3}$$

$$x_{t11} = C_1 + C_2 e^{\frac{-c}{m}t}, \tag{4-4}$$

$$C_1 = -X_e, \quad C_2 = \frac{X_e m^2 w_e^2}{m^2 w_e^2 + c^2}, \tag{4-5}$$

$$x_{t12} = C_3\cos(w_e t) + C_4\sin(w_e t) = \sqrt{C_3^2 + C_4^2}\sin\left[w_e t + \arctan\left(\frac{C_3}{C_4}\right)\right], \tag{4-6}$$

$$C_3 = \frac{X_e c^2}{m^2 w_e^2 + c^2}, \quad C_4 = \frac{cX_e m w_e}{m^2 w_e^2 + c^2}, \tag{4-7}$$

wherein $x_{t11}$ represents a solution of formula (4-2) corresponding to a free vibration response; $x_{t12}$ represents a particular solution of formula (4-2) corresponding to a forced vibration response; $C_1$ represents a particular solution coefficient 1 of formula (4-2) corresponding to the free vibration response; $C_2$ represents a particular solution coefficient 2 of formula (4-2) corresponding to the free vibration response; $C_3$ represents a particular solution coefficient 1 of formula (4-2) corresponding to the forced vibration response; and $C_4$ represents a particular solution coefficient 2 of formula (4-2) corresponding to the forced vibration response.

Due to the processing design of the negative stiffness mechanism and the matching problem of the quasi-zero stiffness vibration isolator during installation, the overall dynamic stiffness of the system may still be positive stiffness, that is $k_m + k > 0$. Then a dynamic mathematical model of the vibration isolation system is shown in formula (4-8). When $c^2 - 4m(k_m + k) < 0$, the vibration response of the system is solved as shown in formulas (4-9) to (4-13).

$$\ddot{x}_t + \frac{c}{m}\dot{x}_t + \frac{k_m + k}{m}x_t = \frac{k_m + k}{m}X_e\cos(w_e t) - \frac{c}{m}X_e w_e\sin(w_e t), \tag{4-8}$$

$$x_t = x_{t21} + x_{t22}, \tag{4-9}$$

$$x_{t21} = C_7 e^{\frac{-c}{2m}t}\cos\left(\sqrt{\frac{k_m+k}{m}}\,t\right) + C_8 e^{\frac{-c}{2m}t}\sin\left(\sqrt{\frac{k_m+k}{m} - \frac{c^2}{4m^2}}\,t\right), \tag{4-10}$$

$$C_7 = \frac{-X_e\left[(k_m+k)(k_m+k-mw_e^2) + c^2 w_e^2\right]}{(k_m+k-mw_e^2)^2 + c^2 w_e^2},$$

$$C_8 = \frac{-cX_e\{2m^2 w_e^4 + [(k_m+k)(k_m+k-mw_e^2) + c^2 w_e^2]\}}{\sqrt{4m(k_m+k)+c^2}\left[(k_m+k-mw_e^2)^2 + c^2 w_e^2\right]}, \tag{4-11}$$

$$x_{t22} = C_9\cos(w_e t) + C_{10}\sin(w_e t) = \sqrt{C_9^2 + C_{10}^2}\sin\left[w_e t + \arctan\left(\frac{C_9}{C_{10}}\right)\right], \tag{4-12}$$

-continued $$C_9 = \frac{X_e\left[(k_m+k)(k_m+k-mw_e^2) + c^2 w_e^2\right]}{(k_m+k-mw_e^2)^2 + c^2 w_e^2},$$

$$C_{10} = \frac{cmX_e w_e^3}{(k_m+k-nw_e^2)^2 + c^2 w_e^2}, \tag{4-13}$$

wherein $x_{t21}$ represents a solution of formula (4-8) corresponding to a free vibration response; $x_{t22}$ represents a particular solution of formula (4-8) corresponding to a forced vibration response; $C_7$ represents a particular solution coefficient 1 of formula (4-8) corresponding to the free vibration response; $C_8$ represents a particular solution coefficient 2 of formula (4-8) corresponding to the free vibration response; $C_9$ represents a particular solution coefficient 1 of formula (4-8) corresponding to the forced vibration response; and $C_{10}$ represents a particular solution coefficient 2 of formula (4-8) corresponding to the forced vibration response.

S6: re-substituting the solution of the vibration response into the expression about the currents about the displacement, the magnitude of the ideal constant value negative stiffness and the related structural parameter, so as to obtain the input current required for meeting the linear "electromagnetic force-displacement" relationship of the negative stiffness electromagnetic actuator.

Figure 6:
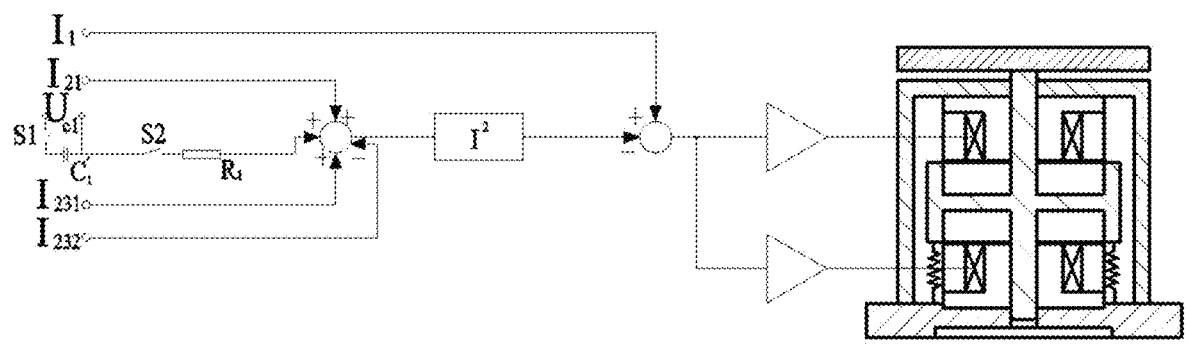
FIG. 6 is a schematic diagram of a control circuit in which a magnitude of a value of the negative stiffness electromagnetic actuator is equal to that of the positive stiffness ($k_m$=−k).

According to formulas (3-6) and (3-7) in combination with the above-mentioned formulas (4-3) to (4-7) and formulas (4-9) to (4-13), under ideal conditions, when the magnitude of the value of the negative stiffness is the same as that of the positive stiffness, that is, $k_m = -k$, the formulas of the control current $I_{c1}$ are shown in formulas (5-1) to (5-4), and the schematic circuit diagram is shown in FIG. 6. When the vibration isolator is not working, there is no current input in other circuits, but a switch S1 in an RLC circuit is closed, and a switch S2 is switched off. Before working, a capacitor is charged to $U_{c1}(0)$. During working, the switch S1 is switched off; the switch S2 is closed; and the capacitor starts to discharge. $C'_1$ represents a resistance value of a capacitor; $R_1$ represents a sum of a resistance value of a circuit and a resistance value of a coil; $L_1$ represents a sum of an inductance of the circuit and an inductance of the coil.

$$I_{c1} = I_1 - I_2^2 = I_1 - (I_{21} + I_{22} + I_{231} - I_{232})^2, \tag{5-1}$$

$$I_1 = \frac{1}{2aN_1}\sqrt{\frac{-k_m}{\mu_0 b S_{in} S_{out}}}\,b^2, \tag{5-2}$$

$$I_2 = \sqrt{\frac{a}{2N_1}}\sqrt{\frac{-k_m}{\mu_0 b S_{in} S_{out}}} = C_0 x = C_0(x_t - x_e) = C_0 x_{t11} + \tag{5-3}$$

$$C_0 x_{t12} - C_0 x_e$$

$$= C_0 C_1 + C_0 C_2 e^{\frac{-c}{m}t} + C_0\sqrt{C_3^2+C_4^2}\sin\left[w_e t + \arctan\left(\frac{C_3}{C_4}\right)\right] -$$

$$C_0 X_e \cos(w_e t)$$

$$= I_{21} + I_{22} + I_{231} - I_{232}$$

$$U_{c1} + R_1 I_{22} + L_1\frac{dI_{22}}{dt} = 0, \left(\frac{c}{m}\right)^2 = \left(\frac{R_1}{2L_1}\right)^2 = \frac{1}{L_1 C'_1}, \tag{5-4}$$

$$U_{c1}(0) = \left(\frac{c}{m} - R_1\right)C_0 C_2,$$

wherein $I_1$ represents a control current 1; $I_2$ represents a control current 2; $I_{21}$ represents a component 1 of the control current 2; $I_{22}$ represents a component 2 of the control current 2; $I_{231}$ represents a component 3 of the control current 2; $I_{232}$ represents a component 4 of the control current 2; $C_0$ represents a linear coefficient between the control current $I_2$ and a working displacement x; $U_{c1}$ represents a real-time voltage of a capacitor 1; and $U_{c1}(0)$ represents a voltage before the capacitor 1 starts to work.

Figure 7:
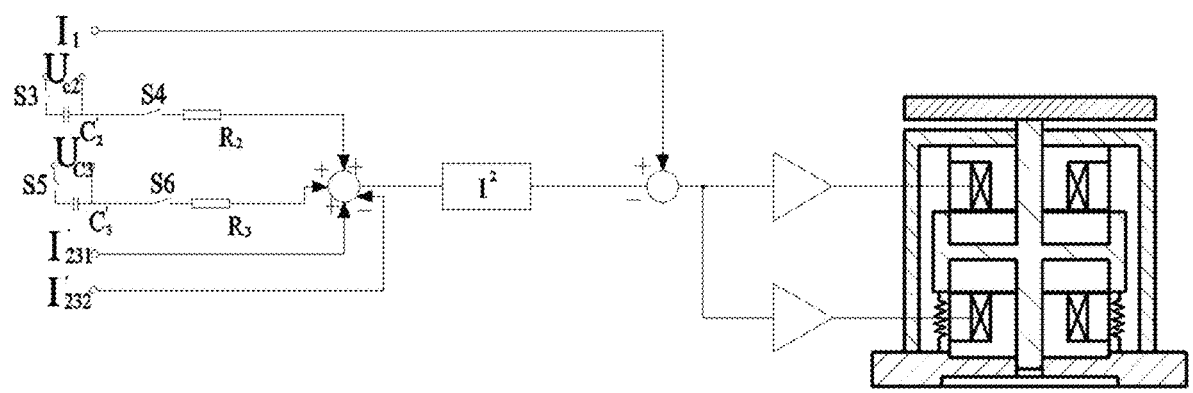
FIG. 7 is a schematic diagram of a control circuit in which a magnitude of a value of the negative stiffness electromagnetic actuator is less than that of the positive stiffness ($k_m$+k>0).

When the magnitude of the value of the negative stiffness is less than that of the positive stiffness, that is, $k_m+k>0$, the formulas of the control current I are shown in formulas (5-5) to (5-10), and the schematic circuit diagram is shown in FIG. 7. When the vibration isolator is not working, there is no current input in other circuits, but switches S3 and S5 in 2 RLC circuits are closed, and switches S4 and S6 are switched off. Before working, the 2 capacitors are respectively charged to $U_{c2}(0)$ and $U_{c3}(0)$. During working, the switches S3 and S5 are switched off; the switches S4 and S6 are closed; and the capacitors start to discharge. $C'_2$ represents a resistance value of a capacitor 2; $R_2$ represents a sum of a resistance value of a circuit 2 and a resistance value of a coil; $L_2$ represents a sum of an inductance of the circuit 2 and an inductance of the coil; $C'_3$ represents a resistance value of a capacitor 3; $R_3$ represents a sum of a resistance value of a circuit 3 and the resistance value of the coil; and $L_3$ represents a sum of an inductance of the circuit 3 and the inductance of the coil.

$$I_{c1} = I_1 - I_2'^2 = I_1 - (I_{21}' + I_{22}' + I_{231}' - I_{232}')^2, \tag{5-5}$$

$$I_1 = \frac{1}{2aN_1}\sqrt{\frac{-k_m}{\mu_0 b S_{in} S_{out}}}\, b^2, \tag{5-6}$$

$$\begin{aligned}I_2' &= C_0'(x_t - x_e) = C_0' x_{t21} + C_0' x_{t22} - C_0' x_e \\ &= C_0' C_7 e^{\frac{-c}{2m}t}\cos\left(\sqrt{\frac{k_m+k}{m}}\,t\right) + C_0' C_8 e^{\frac{-c}{2m}t}\sin\left(\sqrt{\frac{k_m+k}{m} - \frac{c^2}{4m^2}}\,t\right) + \\ &\quad C_0'\sqrt{C_9^2 + C_{10}^2}\sin\left[w_e t + \arctan\left(\frac{C_9}{C_{10}}\right)\right] - C_0' X_e \cos(w_e t) \\ &= I_{21}' + I_{22}' + I_{231}' - I_{232}'\end{aligned} \tag{5-7}$$

$$C_0' = \sqrt{\frac{a}{2N_1}\sqrt{\frac{-k_m}{\mu_0 S_{in} S_{out}}}}, \tag{5-8}$$

$$U_{c2} + R_2 I_{22}' + L_2 \frac{dI_{22}'}{dt} = 0,\ \frac{c}{2m} = \frac{R_2}{2L_2},\ \frac{k_m+k}{m} = \frac{1}{L_2 C_2'} - \frac{R_2^2}{4L_2^2},\ U_{c2}(0) = \left(\frac{L_2 c}{2m} - R_2\right)C_0' C_7, \tag{5-9}$$

$$U_{c3} + R_3 I_{23}' + L_3 \frac{dI_{23}'}{dt} = 0,\ \frac{c}{2m} = \frac{R_3}{2L_3},\ \frac{k_m+k}{m} - \frac{c^2}{4m^2} = \frac{1}{L_3 C_3'} - \frac{R_3^2}{4L_3^2},\ U_{c3}(0) = -\sqrt{\frac{k_m+k}{m}}\,C_0' C_8, \tag{5-10}$$

wherein $I_1$ represents a control current 1; $I'_2$ represents a control current 2'; $I'_{21}$ represents a component 1 of the control current 2'; $I'_{22}$ represents a component 2 of the control current 2'; $I'_{231}$ represents a component 3 of the control current 2'; $I'_{232}$ represents a component 4 of the control current 2'; $C'_0$ represents a linear coefficient between the control current $I'_2$ and a working displacement x; $U_{c2}$ represents a real-time voltage of the capacitor 2; $U_{c2}(0)$ represents a voltage before the capacitor 2 starts to work; $U_{c3}$ represents a real-time voltage of the capacitor 3; and $U_{c3}(0)$ represents a voltage before the capacitor 3 starts to work.

The specific principle of the electromagnetic force control method of the magnetic disk type negative stiffness electromagnetic actuator according to the present disclosure is as follows: in the magnetic disk type quasi-zero stiffness vibration isolator as shown in FIG. 2 to FIG. 5, the negative stiffness electromagnetic actuator is composed of two electromagnets which are symmetrical up and down and have the same size. During working, when upper and lower coils are simultaneously energized with direct currents having the same direction and the equal magnitude, and are in a static balance, upper and lower air gaps are equal, and the electromagnetic attraction force of an upper stator to a rotor component is equal to the electromagnetic attraction force of a lower stator to the rotor component. After an excitation is applied, if the rotor component has an upward movement trend, the upper air gap is greater than the lower air gap, and the electromagnetic attraction force of the upper stator to the rotor component is greater than the electromagnetic attraction force of the lower stator to the rotor component, thereby intensifying the upward movement trend of the rotor component. If the rotor component has a downward movement trend, the lower air gap is less than the upper air gap, and the electromagnetic attraction force of the lower stator to the rotor component is greater than the electromagnetic attraction force of the upper stator to the rotor component, thereby intensifying the downward movement trend of the rotor component. Therefore, negative stiffness characteristics are achieved. In this process, the currents passing into the upper and lower coils are direct currents having the equal magnitude and the same direction, as shown in formula (2-1); the "electromagnetic force-displacement" relationship of the negative stiffness electromagnetic actuator has serious non-linear characteristics, and the nature of the non-linear system thereof enables the dynamic characteristics of the vibration-isolated object to also present non-linearity, which may cause the multi-stable phenomenon, resulting in complex dynamic behaviors such as jumping during working. Therefore, the present disclosure controls the currents input into the upper and lower coils to enable the "electromagnetic force-displacement" relationship of the negative stiffness mechanism to have good linearity, and enable the magnitude of the negative stiffness to be a constant value $k_m$. By analyzing the established "electromagnetic force-displacement" mathematical model of the negative stiffness electromagnetic actuator, the expression about the currents about the displacement, the magnitude of the ideal constant value negative stiffness and the related structural parameter is determined when the currents are taken as the input control variable of the system; the ideal electromagnetic force in a linear form is substituted into a dynamic equation of the vibration-isolated object to obtain a solution of a vibration response; and the solution of the vibration response is then substituted into the expression about the currents about the displacement, the magnitude of the ideal constant value negative stiffness and the related structural parameter, so as to obtain the input current of the negative stiffness electromagnetic actuator required for realizing the linear "electromagnetic force-displacement" relationship.

Specific implementation steps are as follows:

A1: according to the actually required static bearing capacity, determining positive stiffness k of a mechanical spring required for a magnetic disk type quasi-zero stiffness vibration isolator.

A2: establishing an electromagnetic force mathematical model of a single electromagnet under a condition of magnetic unsaturation.

A3: establishing an "electromagnetic force-displacement" relationship mathematical model of the negative stiffness electromagnetic actuator on the basis of the electromagnetic force mathematical model of a single electromagnet.

A4: analyzing the "electromagnetic force-displacement" mathematical model, and determining the expression about the currents about the displacement response, the magnitude of the ideal constant value negative stiffness and the related structural parameter when the currents are taken as the input control variable of the system.

A5: establishing a dynamic mathematical model of a vibration isolation system with a linear electromagnetic force form as shown below, and determining a solution of the vibration response.

When the magnitude of the value of the negative stiffness is the same as that of the positive stiffness, the overall dynamic stiffness of the system is zero, that is, $k_m+k=0$, and the vibration response of the system is solved as shown below.

Due to the processing design of the negative stiffness mechanism and the matching problem of the quasi-zero stiffness vibration isolator during installation, the overall dynamic stiffness of the system may still be positive stiffness, that is, $k_m+k>0$. When $c^2-4m(k_m+k)<0$, the vibration response of the system is shown below.

A6: re-substituting the solution of the vibration response into the expression about the currents about the displacement, the magnitude of the ideal constant value negative stiffness and the related structural parameter, so as to obtain the input current required for meeting the linear "electromagnetic force-displacement" relationship of the negative stiffness electromagnetic actuator.

When the magnitude of the absolute value of the negative stiffness is equal to that of the positive stiffness, that is, $k_m=-k$, the formulas of the control current $I_{c1}(I_{c2})$ are shown below (specifically shown in formulas (5-1) to (5-4)), and the schematic circuit diagram is shown in FIG. 6.

When the magnitude of the absolute value of the negative stiffness is less than that of the positive stiffness, that is, $k_m+k>0$, the formulas of the control current $I_{c1}(I_{c2})$ are shown in formulas (5-5) to (5-8), and the schematic circuit diagram is shown in FIG. 7.

In the present disclosure, according to the actually required static bearing capacity, the positive stiffness k of a mechanical spring required for a magnetic disk type quasi-zero stiffness vibration isolator is determined; an electromagnetic force mathematical model of a single electromagnet under the condition of magnetic unsaturation is established; an "electromagnetic force-displacement" relationship mathematical model of the negative stiffness electromagnetic actuator is established on the basis of the electromagnetic force mathematical model of a single electromagnet; the "electromagnetic force-displacement" mathematical model is analyzed; and the expression about the currents about the displacement response, the magnitude of the ideal constant value negative stiffness and the related structural parameter is determined when the currents are taken as the input variable of the system; a dynamic mathematical model of a vibration isolation system with a linear electromagnetic force form is established, and a solution of displacement response is determined; and the solution of the vibration response is substituted into the expression about the currents about the displacement, the magnitude of the ideal constant value negative stiffness and the related structural parameter, so as to obtain the input current required for meeting the linear "electromagnetic force-displacement" relationship of the negative stiffness electromagnetic actuator. The present disclosure aims at the magnetic disk type quasi-zero stiffness vibration isolator and takes the coil current as the input control variable, so that the electromagnetic force and displacement of the negative stiffness electromagnetic actuator have a linear relationship, thereby changing the non-linear nature of the vibration isolation system, avoiding the multi-stable phenomenon caused by non-linear electromagnetic force during working, and eliminating complex dynamic behaviors such as jumping when the whole vibration isolator works. Complex sensors and control systems are not needed, and implementation manners are simple and convenient.

The above are only the preferred implementation manners of an electromagnetic force control method of a magnetic disk type negative stiffness electromagnetic actuator. The protection scope of the electromagnetic force control method of the magnetic disk type negative stiffness electromagnetic actuator is not limited to the above embodiments, and all technical solutions under this idea belong to the protection scope of the present disclosure. It should be noted that those skilled in the art can make several improvements and changes without departing from the principle of the disclosure, and these improvements and changes should also be regarded as the protection scope of the present disclosure.

What is claimed is:

1. A method of electromagnetic force control of a magnetic disk type negative stiffness electromagnetic actuator, comprising the following steps:

step 1: according to a static bearing capacity, selecting a mechanical spring for providing positive stiffness of a vibration isolation system, and determining positive stiffness of the spring;

step 2: establishing an electromagnetic force expression under magnetic unsaturation, and determining an electromagnetic attraction force of an electromagnet;

step 3: establishing an electromagnetic force-displacement expression according to a symmetrical structure of a negative stiffness electromagnetic actuator under a condition of magnetic unsaturation, wherein the negative stiffness electromagnetic actuator comprises a first electromagnet and a second electromagnet which are symmetrical up and down and have the same size;

step 4: analyzing the electromagnetic force-displacement expression, and determining an expression of currents passing through a first coil of the first electromagnet and a second coil of the second electromagnet 7 with respect to structural parameters, a displacement and a magnitude of ideal constant value negative stiffness when the negative stiffness electromagnetic actuator takes the currents as input control variables;

step 5: establishing a vibration isolation system dynamic formula, and determining a vibration response according to the electromagnetic force-displacement expression of the negative stiffness electromagnetic actuator under ideal conditions; and step 6: according to the vibration response and based on the expression of the currents with respect to the structural parameters, the displacement and the magnitude of the ideal constant value negative stiffness, determining a control current required for the negative stiffness electromagnetic actuator to meet a linear electromagnetic force-displacement relationship.

2. The method according to claim 1, wherein the step 2 comprises: establishing an electromagnetic force expression under magnetic unsaturation, determining an electromagnetic attraction force of an electromagnet, and representing the electromagnetic attraction force of the electromagnet by the following formulas:

$$F_{mag1} = \frac{1}{2}\frac{\Phi_1^2}{\mu_0 S_{in}} + \frac{1}{2}\frac{\Phi_1^2}{\mu_0 S_{out}},$$

$$\Phi_1 = \frac{N_1 I_{C1}}{R_{total1}},$$

$$S_{out} = \frac{\pi}{4}(l_6^2 - l_5^2),$$

$$S_{in} = \frac{\pi}{4}(l_4^2 - l_3^2),$$

wherein $F_{mag1}$ represents an electromagnetic attraction force of first electromagnet; $R_{total1}$ represents a total reluctance of the first electromagnet; $\Phi_1$ represents a magnetic flux of the first electromagnet; $\mu_0$ represents permeability of vacuum; $S_{in}$ represents an equivalent cross-sectional area of an inner magnetic pole; $S_{out}$ represents an equivalent cross-sectional area of an outer magnetic pole; and $I_{c1}$ represents a current passing through the first coil; and determining the total reluctance of the first electromagnet according to an air gap reluctance of first armature and a reluctance of the first armature, and representing the total reluctance of the first electromagnet by the following formulas:

$$R_{total1} = R_{gap11} + R_{gap12} + R_{arm} + R_{iron},$$

$$R_{iron} = \frac{l_b}{\mu_1 S_{in}} + \frac{l_b}{\mu_1 S_{out}} + \frac{l_a}{\mu_1 S_1},$$

$$R_{arm} = \frac{l_8}{2\mu_1 S_{in}} + \frac{l_8}{2\mu_1 S_{out}} + \frac{l_a}{\mu_1 S_2},$$

$$R_{gap11} = \frac{x_1}{\mu_1 S_{in}},$$

$$R_{gap12} = \frac{x_1}{\mu_0 S_{out}},$$

$$S_1 = \frac{\pi}{16}(l_1 - l_2)(l_3 + l_4 + l_5 + l_6),$$

$$S_2 = \frac{\pi}{4}l_8(l_3 + l_4 + l_5 + l_6),$$

$$l_a = \frac{l_5 + l_6 - l_3 - l_4}{4},$$

$$l_b = \frac{l_1 + l_2}{2},$$

wherein $S_1$ represents an equivalent cross-sectional area of a magnetic circuit in a horizontal direction of a first iron core; $S_2$ represents an equivalent cross-sectional area of a magnetic circuit in a horizontal direction of the first armature; $x_1$ represents an air gap of the first electromagnet; $\mu_1$ represents a magnetic permeability of materials of the first iron core, a second iron core, the first armature and a second armature; $R_{gap11}$ represents an air gap reluctance corresponding to an inner magnetic pole of the first armature; $R_{gap12}$ represents an air gap reluctance corresponding to an outer magnetic pole of the first armature; $R_{arm}$ represents the reluctance of the first armature; $R_{iron}$ represents a reluctance of the first iron core; $N_1$ represents the number of turns of the first coil of the first electromagnet 1; $l_1$ represents a height of the first iron core; $l_2$ represents a height of first coil of the first electromagnet; $l_3$ represents an inner diameter of the first armature; $l_4$ represents an inner diameter of the first coil of the first electromagnet; $l_5$ represents an outer diameter of the first coil of the first electromagnet; $l_6$ represents an outer diameter of the first iron core; $l_7$ represents an outer diameter of the first armature; $l_8$ represents a height of the first armature, $l_a$ represents an intermediate calculation variable about $l_3$, $l_4$, $l_5$ and $l_6$; and $l_b$ represents an intermediate calculation variable about $l_1$ and $l_2$.

3. The method according to claim 2, wherein the step 3 comprises: according to a structure that the negative stiffness electromagnetic actuator is symmetrical up and down, establishing an electromagnetic force-displacement expression of the negative stiffness electromagnetic actuator under the condition of magnetic unsaturation, determining a magnitude of an electromagnetic attraction force of the negative stiffness electromagnetic actuator under ideal conditions, and representing an electromagnetic attraction force $F_{mag}$ under ideal conditions by the following formulas:

$$F_{mag} = F_{mag1} - F_{mag2} = 2N_1^2 I_{c1}^2 \mu_0 S_{in} S_{out}(S_{in} + S_{out})\left[\frac{1}{(ax+b)^2} - \frac{1}{(ax-b)^2}\right],$$

$$F_{mag2} = \frac{1}{2}\frac{\Phi_2^2}{\mu_0 S_{in}} + \frac{1}{2}\frac{\Phi_2^2}{\mu_0 S_{out}},$$

$$a = 2(S_{in} + S_{out}),$$

$$b = \left(\frac{l_8}{\mu_r} + \frac{2l_b}{\mu_r} + 2g\right)(S_{in} + S_{out}) + \frac{2l_a}{\mu_r}S_{in}S_{out}\left(\frac{1}{S_1} + \frac{1}{S_2}\right),$$

wherein $F_{mag2}$ represents an electromagnetic attraction force of second electromagnet; $\Phi_2$ represents a magnetic flux of the second electromagnet; x represents a displacement of a negative stiffness spring; $I_{c1}$ represents a current passing through the first coil, and a current $I_{c2}$ passing through the second coil is equal to the current $I_{c1}$; $\mu_r$ represents a magnitude of a relative magnetic conductivity of materials of the first iron core, the second iron core, the first armature and the second armature; g represents a maximum value of a unilateral air gap; a represents an intermediate calculation variable about $S_{in}$ and $S_{out}$; and b represents an intermediate calculation variable about $l_g$, $l_a$, $l_b$, $S_{in}$, $S_{out}$, $S_1$, $S_2$ and $\mu_r$; and according to the number of turns of the coil and the current of the second electromagnet and the total reluctance of the second electromagnet, determining the magnetic flux of the second electromagnet, and representing the magnetic flux of the second electromagnet by the following formulas:

$$\Phi_2 = \frac{N_2 I_2}{R_{total2}},$$

$$R_{total2} = R_{gap21} + R_{gap22} + R_{arm} + R_{iron},$$

$$R_{gap21} = \frac{x_2}{\mu_0 S_{in}},$$

$$R_{gap22} = \frac{x_2}{\mu_0 S_{out}},$$

wherein $x_2$ represents an air gap of the second electromagnet; $N_2$ represents the number of turns of the second coil of the second electromagnet; $R_{total2}$ represents a total reluctance of the second electromagnet; $R_{gap21}$ represents an air gap reluctance corresponding to an inner magnetic pole of the second armature, and $R_{gap22}$ represents an air gap reluctance corresponding to an outer magnetic pole of the second armature.

4. The method according to claim 3, wherein the step 4 comprises: step 4.1: determining an electromagnetic force-displacement expression of the negative stiffness electromagnetic actuator, and making the electromagnetic force-displacement expression of the negative stiffness electromagnetic actuator about the structural parameters and the control current equal to an electromagnetic force-displacement expression about ideal negative stiffness:

$$F_{mag} = 2N_1^2 I_{c1}^2 \mu_0 S_{in} S_{out}(S_{in} + S_{out})\left[\frac{1}{(ax+b)^2} - \frac{1}{(ax-b)^2}\right] = k_m x,$$

$$F_{mag} = k_m x,$$

wherein $k_m$ represents a magnitude of the ideal constant value negative stiffness; and step 4.2: analyzing the electromagnetic force-displacement expression, and determining the expression of currents passing through the first coil and the second coil with respect to the displacement, the magnitude of the ideal constant value negative stiffness and the structural parameters when the negative stiffness electromagnetic actuator takes the current as the input control variable:

$$I_{c1} = \frac{1}{2aN_1}\sqrt{\frac{-k_m}{\mu_0 b S_{in} S_{out}}}\sqrt{(ax+b)^2(ax-b)^2},$$

$$ax + b = \left(\frac{l_g}{\mu_r} + \frac{2l_b}{\mu_r} + 2g + 2x\right)(S_{in} + S_{out}) + \frac{2l_a}{\mu_r}S_{in}S_{out}\left(\frac{1}{S_1} + \frac{1}{S_2}\right) > 0,$$

$$b - ax = \left(\frac{l_g}{\mu_r} + \frac{2l_b}{\mu_r} + 2(g - x)\right)(S_{in} + S_{out}) + \frac{2l_a}{\mu_r}S_{in}S_{out}\left(\frac{1}{S_1} + \frac{1}{S_2}\right) > 0,$$

$$ax - b < 0,$$

$$I_{c1} = \frac{1}{2aN_1}\sqrt{\frac{-k_m}{\mu_0 b S_{in} S_{out}}} b^2 - \frac{a}{2N_1}\sqrt{\frac{-k_m}{\mu_0 b S_{in} S_{out}}} x^2 = I_1 - I_2^2,$$

$$I_1 = \frac{1}{2aN_1}\sqrt{\frac{-k_m}{\mu_0 b S_{in} S_{out}}} b^2, \quad I_2 = \sqrt{\frac{a}{2N_1}\sqrt{\frac{-k_m}{\mu_0 b S_{in} S_{out}}} x},$$

wherein $I_{c1}$ represents a current passing through the first coil, and a current $I_{c2}$ passing through the second coil is equal to the current $I_{c1}$; and $\mu_r$ represents a magnitude of a relative magnetic conductivity of materials of the first iron core, the second iron core, the first armature and the second armature.

5. The method according to claim 4, wherein the step 5 comprises:

step 5.1: establishing a vibration isolation system dynamic formula, and substituting an ideal electromagnetic force form into a dynamic mathematical model of a vibration isolation system by the following formulas:

$$m\ddot{x}_t + c(\dot{x}_t - \dot{x}_e) + k_m(x_t - x_e) + k(x_t - x_e) = 0,$$

$$x_e = X_e \cos(w_e t),$$

$$x = x_t - x_e,$$

wherein m represents a vibration-isolated mass; $\ddot{x}_t$ represents a vibration response acceleration of a vibration-isolated object; $\dot{x}_t$ represents a vibration response speed of the vibration-isolated object; $x_e$ represents a system excitation; $\dot{x}_e$ represents a system excitation speed; c represents a system damping; $x_t$ represents a vibration response of the vibration-isolated object; k represents a magnitude of a value of the positive stiffness; $X_e$ represents an excitation amplitude; $w_e$ represents an excitation frequency; and t represents time;

step 5.2: under ideal conditions, when a magnitude of an absolute value of negative stiffness is the same as that of positive stiffness and an overall dynamic stiffness of the system is zero, that is, $k_m + k = 0$, representing a dynamic mathematic model of the vibration isolation system by the following formula:

$$\ddot{x}_t + \frac{c}{m}\dot{x}_t = \frac{-cX_e w_e}{m}\sin(w_e t),$$

determining a displacement response, and representing a vibration response by the following formulas:

$$x_{t11} = C_1 + C_2 e^{\frac{-c}{m}t},$$

$$C_1 = -X_e, \quad C_2 = \frac{X_e m^2 w_e^2}{m^2 w_e^2 + c^2},$$

$$x_{t12} = C_3 \cos(w_e t) + C_4 \sin(w_e t) = \sqrt{C_3^2 + C_4^2}\sin\left[w_e t + \arctan\left(\frac{C_3}{C_4}\right)\right],$$

$$C_3 = \frac{X_e c^2}{m^2 w_e^2 + c^2}, \quad C_4 = \frac{cX_e m w_e}{m^2 w_e^2 + c^2},$$

wherein $x_{t11}$ represents a solution corresponding to a free vibration response; $x_{t12}$ represents a particular solution corresponding to a forced vibration response; $C_1$ represents a coefficient of a particular solution corresponding to the free vibration response; $C_2$ represents a coefficient of the particular solution corresponding to the free vibration response; $C_3$ represents a coefficient of a particular solution corresponding to the forced vibration response; and $C_4$ represents a coefficient of the particular solution corresponding to the forced vibration response; and step 5.3: when stiffness of the negative stiffness mechanism is positive stiffness, that is, $k_m+k>0$, representing a dynamic mathematic model of the vibration isolation system by the following formula:

$$\ddot{x}_t + \frac{c}{m}\dot{x}_t + \frac{k_m+k}{m}x_t = \frac{k_m+k}{m}X_e\cos(w_e t) - \frac{c}{m}X_e w_e \sin(w_e t),$$

determining a displacement response, and representing the displacement response by the following formulas:

$$x_t = x_{t21} + x_{t22},$$

$$x_{t21} = C_7 e^{\frac{-c}{2m}t}\cos\left(\sqrt{\frac{k_m+k}{m}}\,t\right) + C_8 e^{\frac{-c}{2m}t}\sin\left(\sqrt{\frac{k_m+k}{m}-\frac{c^2}{4m^2}}\,t\right),$$

$$C_8 = \frac{-cX_e\{2m^2 w_e^4 + [(k_m+k)(k_m+k-mw_e^2)+c^2 w_e^2]\}}{\sqrt{4m(k_m+k)+c^2}\,[(k_m+k-mw_e^2)^2+c^2 w_e^2]},$$

$$x_{t22} = C_9\cos(w_e t) + C_{10}\sin(w_e t) = \sqrt{C_9^2+C_{10}^2}\sin\left[w_e t + \arctan\left(\frac{C_9}{C_{10}}\right)\right],$$

$$C_9 = \frac{X_e[(k_m+k)(k_m+k-mw_e^2)+c^2 w_e^2]}{(k_m+k-mw_e^2)^2+c^2 w_e^2},$$

$$C_{10} = \frac{cmX_e w_e^3}{(k_m+k-mw_e^2)^2+c^2 w_e^2},$$

wherein $x_{t21}$ represents a solution corresponding to a free vibration response; $x_{t22}$ represents a particular solution corresponding to a forced vibration response; $C_7$ represents a coefficient of a particular solution corresponding to the free vibration response; $C_8$ represents a coefficient of the particular solution corresponding to the free vibration response; $C_9$ represents a coefficient of a particular solution corresponding to the forced vibration response; and $C_{10}$ represents a coefficient of the particular solution corresponding to the forced vibration response.

6. The method according to claim 5, wherein the step 6 comprises:

under ideal conditions, when a magnitude of a value of negative stiffness is the same as that of positive stiffness, that is, $k_m=-k$, representing the control current $I_{c1}$ ($I_{c2}$) by the following formulas:

$$I_{c1} = I_1 - (I_{21}+I_{22}+I_{231}-I_{232})^2,$$

$$I_1 = \frac{1}{2aN_1}\sqrt{\frac{-k_m}{\mu_0 bS_{in}S_{out}}}\,b^2,$$

$$I_2 = I_{21}+I_{22}+I_{231}-I_{232}$$

$$\sqrt{\frac{a}{2N_1}\sqrt{\frac{-k_m}{\mu_0 bS_{in}S_{out}}}} = C_0 x = C_0(x_t - x_e) = C_0 x_{t11} + C_0 x_{t12} - C_0 x_e$$

$$C_0 C_1 + C_0 C_2 e^{\frac{-c}{m}t} + C_0\sqrt{C_3^2+C_4^2}\sin\left[w_e t + \arctan\left(\frac{C_3}{C_4}\right)\right] - C_0 X_e \cos(w_e t),$$

$$U_{c1} + R_1 I_{22} + L_1\frac{dI_{22}}{dt} = 0,\; \left(\frac{c}{m}\right)^2 = \left(\frac{R_1}{2L_1}\right)^2 = \frac{1}{L_1 C_1'},\; U_{c1}(0) = \left(\frac{c}{m}-R_1\right)C_0 C_2,$$

wherein C′$_1$ represents a resistance value of a capacitor; R$_1$ represents a sum of a resistance value of a circuit and a resistance value of a coil; L$_1$ represents a sum of an inductance of the circuit and an inductance of the coil; I$_1$ represents a first control current; I$_2$ represents a second control current; I$_{21}$ represents a first component of the second control current; I$_{22}$ represents a second component of the second control current; I$_{231}$ represents a third component of the second control current; I$_{232}$ represents a fourth component of the second control current; C$_0$ represents a linear coefficient between the control current I$_2$ and a working displacement x; U$_{c1}$ represents a real-time voltage of a first capacitor; and U$_{c1}$(0) represents a voltage before the first capacitor starts to work; and when the magnitude of the value of the negative stiffness is less than that of the positive stiffness, that is, $k_m + k > 0$, representing the control current $I_{c1}$ ($I_{c2}$) by the following formulas:

$$I_{c1} = I_1 - I_2'^2 = I_1 - (I_{21}' + I_{22}' + I_{231}' - I_{232}')^2,$$

$$I_1 = \frac{1}{2aN_1}\sqrt{\frac{-k_m}{\mu_0 b S_{in} S_{out}}} b^2,$$

$$I_2' = C_0'(x_t - x_e) = C_0' x_{t21} + C_0' x_{t22} - C_0' x_e$$

$$= C_0' C_7 e^{\frac{-c}{2m}t}\cos\left(\sqrt{\frac{k_m+k}{m}}\,t\right) + C_0' C_8 e^{\frac{-c}{2m}t}\sin\left(\sqrt{\frac{k_m+k}{m} - \frac{c^2}{4m^2}}\,t\right) +$$

$$C_0'\sqrt{C_9^2 + C_{10}^2}\,\sin\!\left[w_e t + \arctan\!\left(\frac{C_9}{C_{10}}\right)\right] - C_0' X_e \cos(w_e t)$$

$$= I_{21}' + I_{22}' + I_{231}' - I_{232}',$$

$$C_0' = \sqrt{\frac{a}{2N_1}\sqrt{\frac{-k_m}{\mu_0 b S_{in} S_{out}}}},$$

$$U_{c2} + R_2 I_{21}' + L_2 \frac{dI_{21}'}{dt} = 0,$$

$$\frac{c}{2m} = \frac{R_2}{2L_2},\ \frac{k_m+k}{m} = \frac{1}{L_2 C_2'} - \frac{R_2^2}{4L_2^2},\ U_{c2}(0) = \left(\frac{L_2 c}{2m} - R_2\right)C_0' C_7,$$

$$U_{c3} + R_3 I_{22}' + L_3 \frac{dI_{22}'}{dt} = 0,$$

$$\frac{c}{2m} = \frac{R_3}{2L_3},\ \frac{k_m+k}{m} - \frac{c^2}{4m^2} = \frac{1}{L_3 C_3'} - \frac{R_3^2}{4L_3^2},\ U_{c3}(0) = -\sqrt{\frac{k_m+k}{m}}\,C_0' C_8,$$

wherein C′$_2$ represents a resistance value of a second capacitor; R$_2$ represents a sum of a resistance value of a second circuit and a resistance value of a coil; L$_2$ represents a sum of an inductance of the second circuit and an inductance of the coil; C′$_3$ represents a resistance value of a third capacitor; R$_3$ represents a sum of a resistance value of a third circuit and the resistance value of the coil; L$_3$ represents a sum of an inductance of the third circuit and the inductance of the coil; I$_1$ represents a first control current; I′$_2$ represents a second control current; I′$_{21}$ represents a first component of the second control current; I′$_{22}$ represents a second component of the second control current; I′$_{231}$ represents a third component of the second control current; I′$_{232}$ represents a fourth component of the second control current; C′$_0$ represents a linear coefficient between the control current I′$_2$ and a working displacement x; U$_{c2}$ represents a real-time voltage of the second capacitor; U$_{c2}$(0) represents a voltage before the second capacitor starts to work; U$_{c3}$ represents a real-time voltage of the third capacitor; and U$_{c3}$(0) represents a voltage before the third capacitor starts to work.

\* \* \* \* \*